United States Patent
Gokhale

(10) Patent No.: US 8,930,496 B2
(45) Date of Patent: Jan. 6, 2015

(54) SYSTEMS AND METHODS OF UNIFIED RECONSTRUCTION IN STORAGE SYSTEMS

(75) Inventor: Parag Gokhale, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 1278 days.

(21) Appl. No.: 11/639,855

(22) Filed: Dec. 15, 2006

(65) Prior Publication Data

US 2007/0226535 A1    Sep. 27, 2007

Related U.S. Application Data

(60) Provisional application No. 60/752,202, filed on Dec. 19, 2005.

(51) Int. Cl.
| | | |
|---|---|---|
| *G06F 15/16* | (2006.01) | |
| *G06F 17/30* | (2006.01) | |
| *G06F 11/14* | (2006.01) | |

(52) U.S. Cl.
CPC ........ *G06F 11/1435* (2013.01); *G06F 11/1469* (2013.01); *G06F 17/30997* (2013.01)
USPC ........... 709/219; 709/203; 709/212; 709/213; 709/216; 709/221

(58) Field of Classification Search
None
See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |

(Continued)

FOREIGN PATENT DOCUMENTS

| | | |
|---|---|---|
| EP | 0 259 912 | 3/1988 |
| EP | 0 405 926 | 1/1991 |

(Continued)

OTHER PUBLICATIONS

Armstead et al., "Implementation of a Campus-wide Distributed Mass Storage Service: The Dream vs. Reality," *IEEE*, 1995, pp. 190-199.

(Continued)

*Primary Examiner* — Rupal Dharia
*Assistant Examiner* — Van Kim T Nguyen
(74) *Attorney, Agent, or Firm* — Knobbe, Martens, Olson & Bear, LLP

(57) ABSTRACT

Systems and methods for reconstructing unified data in an electronic storage network are provided which may include the identification and use of metadata stored centrally within the system. The metadata may be generated by a group of storage operation cells during storage operations within the network. The unified metadata is used to reconstruct data throughout the storage operation cells that may be missing, deleted or corrupt.

38 Claims, 12 Drawing Sheets

(56) References Cited

U.S. PATENT DOCUMENTS

| | | | |
|---|---|---|---|
| 5,321,816 A | 6/1994 | Rogan et al. | |
| 5,333,315 A | 7/1994 | Saether et al. | |
| 5,347,653 A | 9/1994 | Flynn et al. | |
| 5,410,700 A | 4/1995 | Fecteau et al. | |
| 5,448,724 A | 9/1995 | Hayashi | |
| 5,491,810 A | 2/1996 | Allen | |
| 5,495,607 A | 2/1996 | Pisello et al. | |
| 5,504,873 A | 4/1996 | Martin et al. | |
| 5,519,865 A | 5/1996 | Kondo et al. | |
| 5,544,345 A | 8/1996 | Carpenter et al. | |
| 5,544,347 A | 8/1996 | Yanai et al. | |
| 5,559,957 A | 9/1996 | Balk | |
| 5,590,318 A | 12/1996 | Zbikowski et al. | |
| 5,619,644 A | 4/1997 | Crockett et al. | |
| 5,623,679 A | 4/1997 | Rivette et al. | |
| 5,638,509 A | 6/1997 | Dunphy et al. | |
| 5,673,381 A | 9/1997 | Huai et al. | |
| 5,699,361 A | 12/1997 | Ding et al. | |
| 5,729,743 A | 3/1998 | Squibb | |
| 5,737,747 A | 4/1998 | Vishlitzky et al. | |
| 5,751,997 A | 5/1998 | Kullick et al. | |
| 5,758,359 A | 5/1998 | Saxon | |
| 5,761,677 A | 6/1998 | Senator et al. | |
| 5,764,972 A | 6/1998 | Crouse et al. | |
| 5,778,395 A | 7/1998 | Whiting et al. | |
| 5,812,398 A | 9/1998 | Nielsen | |
| 5,813,009 A | 9/1998 | Johnson et al. | |
| 5,813,017 A | 9/1998 | Morris | |
| 5,829,046 A | 10/1998 | Tzelnic et al. | |
| 5,832,510 A | 11/1998 | Ito et al. | |
| 5,875,478 A | 2/1999 | Blumenau | |
| 5,887,134 A | 3/1999 | Ebrahim | |
| 5,892,917 A | 4/1999 | Myerson | |
| 5,901,327 A | 5/1999 | Ofek | |
| 5,907,621 A | 5/1999 | Bachman et al. | |
| 5,918,232 A | 6/1999 | Pouschine et al. | |
| 5,924,102 A | 7/1999 | Perks | |
| 5,950,205 A | 9/1999 | Aviani, Jr. | |
| 5,953,721 A | 9/1999 | Doi et al. | |
| 5,974,563 A | 10/1999 | Beeler, Jr. | |
| 6,006,225 A | 12/1999 | Bowman et al. | |
| 6,021,415 A | 2/2000 | Cannon et al. | |
| 6,023,710 A | 2/2000 | Steiner et al. | |
| 6,026,414 A | 2/2000 | Anglin | |
| 6,052,735 A | 4/2000 | Ulrich et al. | |
| 6,058,066 A | 5/2000 | Norris et al. | |
| 6,061,692 A | 5/2000 | Thomas et al. | |
| 6,076,148 A | 6/2000 | Kedem | |
| 6,088,697 A | 7/2000 | Crockett et al. | |
| 6,092,062 A | 7/2000 | Lohman et al. | |
| 6,094,416 A | 7/2000 | Ying | |
| 6,131,095 A | 10/2000 | Low et al. | |
| 6,131,190 A | 10/2000 | Sidwell | |
| 6,148,412 A | 11/2000 | Cannon et al. | |
| 6,154,787 A | 11/2000 | Urevig et al. | |
| 6,154,852 A | 11/2000 | Amundson et al. | |
| 6,161,111 A | 12/2000 | Mutalik et al. | |
| 6,167,402 A | 12/2000 | Yeager | |
| 6,175,829 B1 | 1/2001 | Li et al. | |
| 6,185,574 B1 | 2/2001 | Howard et al. | |
| 6,212,512 B1 | 4/2001 | Barney et al. | |
| 6,240,416 B1 | 5/2001 | Immon et al. | |
| 6,260,068 B1 | 7/2001 | Zalewski et al. | |
| 6,260,069 B1 | 7/2001 | Anglin | |
| 6,269,431 B1 | 7/2001 | Dunham | |
| 6,275,953 B1 | 8/2001 | Vahalia et al. | |
| 6,301,592 B1 | 10/2001 | Aoyama et al. | |
| 6,324,581 B1 | 11/2001 | Xu et al. | |
| 6,328,766 B1 | 12/2001 | Long | |
| 6,330,570 B1 | 12/2001 | Crighton | |
| 6,330,642 B1 | 12/2001 | Carteau | |
| 6,343,324 B1 | 1/2002 | Hubis et al. | |
| 6,350,199 B1 | 2/2002 | Williams et al. | |
| RE37,601 E | 3/2002 | Eastridge et al. | |
| 6,353,878 B1 | 3/2002 | Dunham | |
| 6,356,801 B1 | 3/2002 | Goodman et al. | |
| 6,374,336 B1 | 4/2002 | Peters et al. | |
| 6,389,432 B1 | 5/2002 | Pothapragada et al. | |
| 6,418,478 B1 | 7/2002 | Ignatius et al. | |
| 6,421,683 B1 | 7/2002 | Lamburt | |
| 6,421,711 B1 | 7/2002 | Blumenau et al. | |
| 6,421,779 B1 | 7/2002 | Kuroda et al. | |
| 6,430,575 B1 | 8/2002 | Dourish et al. | |
| 6,438,586 B1 | 8/2002 | Hass et al. | |
| 6,438,595 B1 | 8/2002 | Blumenau et al. | |
| 6,487,561 B1 | 11/2002 | Ofek et al. | |
| 6,487,644 B1 | 11/2002 | Huebsch et al. | |
| 6,499,026 B1 | 12/2002 | Rivette et al. | |
| 6,507,852 B1 | 1/2003 | Dempsey | |
| 6,516,314 B1 | 2/2003 | Birkler et al. | |
| 6,516,348 B1 | 2/2003 | MacFarlane et al. | |
| 6,519,679 B2 | 2/2003 | Devireddy et al. | |
| 6,538,669 B1 | 3/2003 | Lagueux, Jr. et al. | |
| 6,542,468 B1 | 4/2003 | Hatakeyama | |
| 6,542,909 B1 | 4/2003 | Tamer et al. | |
| 6,542,972 B2 | 4/2003 | Ignatius et al. | |
| 6,564,228 B1 | 5/2003 | O'Connor | |
| 6,581,143 B2 | 6/2003 | Gagne et al. | |
| 6,611,849 B1 | 8/2003 | Raff et al. | |
| 6,625,623 B1 | 9/2003 | Midgley et al. | |
| 6,647,396 B2 | 11/2003 | Parnell et al. | |
| 6,658,436 B2 | 12/2003 | Oshinsky et al. | |
| 6,658,526 B2 | 12/2003 | Nguyen et al. | |
| 6,732,124 B1 * | 5/2004 | Koseki et al. | 1/1 |
| 6,763,351 B1 | 7/2004 | Subramaniam et al. | |
| 6,772,164 B2 | 8/2004 | Reinhardt | |
| 6,775,790 B2 | 8/2004 | Reuter et al. | |
| 6,779,003 B1 | 8/2004 | Midgley et al. | |
| 6,785,864 B1 | 8/2004 | Te et al. | |
| 6,792,472 B1 | 9/2004 | Otterness et al. | |
| 6,820,035 B1 | 11/2004 | Zahavi et al. | |
| 6,834,329 B2 | 12/2004 | Sasaki et al. | |
| 6,836,779 B2 | 12/2004 | Poulin | |
| 6,836,806 B1 * | 12/2004 | Raciborski et al. | 709/245 |
| 6,839,724 B2 * | 1/2005 | Manchanda et al. | 707/625 |
| 6,847,984 B1 | 1/2005 | Midgley et al. | |
| 6,857,053 B2 | 2/2005 | Bolik | |
| 6,871,163 B2 | 3/2005 | Hiller et al. | |
| 6,886,020 B1 | 4/2005 | Zahavi et al. | |
| 6,920,537 B2 | 7/2005 | Ofek et al. | |
| 6,925,476 B1 | 8/2005 | Multer et al. | |
| 6,947,935 B1 | 9/2005 | Horvitz et al. | |
| 6,976,053 B1 | 12/2005 | Tripp et al. | |
| 6,983,322 B1 | 1/2006 | Tripp et al. | |
| 6,996,616 B1 | 2/2006 | Leighton et al. | |
| 7,003,519 B1 | 2/2006 | Biettron et al. | |
| 7,035,880 B1 | 4/2006 | Crescenti et al. | |
| 7,047,236 B2 | 5/2006 | Conroy | |
| 7,068,597 B1 | 6/2006 | Fijolek et al. | |
| 7,103,740 B1 | 9/2006 | Colgrove et al. | |
| 7,106,691 B1 | 9/2006 | DeCaluwe et al. | |
| 7,107,298 B2 | 9/2006 | Prahlad et al. | |
| 7,130,860 B2 | 10/2006 | Pachet | |
| 7,130,970 B2 | 10/2006 | Devassy et al. | |
| 7,149,750 B2 | 12/2006 | Chadwick | |
| 7,158,985 B1 | 1/2007 | Liskov | |
| 7,165,082 B1 | 1/2007 | DeVos | |
| 7,167,895 B1 | 1/2007 | Connelly | |
| 7,171,619 B1 | 1/2007 | Bianco | |
| 7,181,444 B2 | 2/2007 | Porter et al. | |
| 7,194,454 B2 | 3/2007 | Hansen et al. | |
| 7,197,502 B2 | 3/2007 | Feinsmith | |
| 7,200,726 B1 | 4/2007 | Gole | |
| 7,216,043 B2 | 5/2007 | Ransom et al. | |
| 7,240,100 B1 | 7/2007 | Wein et al. | |
| 7,246,207 B2 | 7/2007 | Kottomtharayil et al. | |
| 7,246,211 B1 | 7/2007 | Beloussov et al. | |
| 7,269,612 B2 | 9/2007 | Devarakonda et al. | |
| 7,272,606 B2 | 9/2007 | Borthakur et al. | |
| 7,330,997 B1 | 2/2008 | Odom | |
| 7,340,652 B2 * | 3/2008 | Jarvis et al. | 714/42 |
| 7,343,365 B2 | 3/2008 | Farnham et al. | |
| 7,346,623 B2 | 3/2008 | Prahlad et al. | |
| 7,346,676 B1 | 3/2008 | Swildens et al. | |

(56) References Cited

U.S. PATENT DOCUMENTS

| | | | |
|---|---|---|---|
| 7,356,657 B2 | 4/2008 | Mikami | |
| 7,356,660 B2 | 4/2008 | Matsunami | |
| 7,359,917 B2 | 4/2008 | Winter et al. | |
| 7,366,859 B2 | 4/2008 | Per et al. | |
| 7,386,663 B2 | 6/2008 | Cousins | |
| 7,395,282 B1 | 7/2008 | Crescenti | |
| 7,401,064 B1* | 7/2008 | Arone et al. | 1/1 |
| 7,418,464 B2 | 8/2008 | Cannon et al. | |
| 7,430,587 B2 | 9/2008 | Malone et al. | |
| 7,433,301 B2 | 10/2008 | Akahane et al. | |
| 7,440,966 B2 | 10/2008 | Adkins | |
| 7,440,984 B2 | 10/2008 | Augenstein | |
| 7,454,569 B2 | 11/2008 | Kavuri et al. | |
| 7,461,230 B1 | 12/2008 | Gupta et al. | |
| 7,469,262 B2* | 12/2008 | Baskaran et al. | 1/1 |
| 7,472,312 B2* | 12/2008 | Jarvis et al. | 714/42 |
| 7,496,589 B1 | 2/2009 | Jain et al. | |
| 7,500,150 B2 | 3/2009 | Sharma et al. | |
| 7,509,316 B2 | 3/2009 | Greenblatt et al. | |
| 7,512,601 B2 | 3/2009 | Cucerzan et al. | |
| 7,512,814 B2 | 3/2009 | Chen | |
| 7,529,745 B2* | 5/2009 | Ahluwalia et al. | 1/1 |
| 7,529,748 B2 | 5/2009 | Wen et al. | |
| 7,532,340 B2 | 5/2009 | Koppich et al. | |
| 7,533,103 B2 | 5/2009 | Brendle et al. | |
| 7,533,181 B2* | 5/2009 | Dawson et al. | 709/229 |
| 7,533,230 B2 | 5/2009 | Glover et al. | |
| 7,546,364 B2 | 6/2009 | Raman et al. | |
| 7,583,861 B2 | 9/2009 | Hanna et al. | |
| 7,584,227 B2 | 9/2009 | Gokhale | |
| 7,590,997 B2 | 9/2009 | Perez | |
| 7,613,728 B2 | 11/2009 | Png et al. | |
| 7,613,752 B2 | 11/2009 | Prahlad et al. | |
| 7,617,321 B2* | 11/2009 | Clark | 709/229 |
| 7,617,541 B2 | 11/2009 | Plotkin et al. | |
| 7,620,710 B2 | 11/2009 | Kottomtharayil | |
| 7,624,443 B2 | 11/2009 | Kramer | |
| 7,627,598 B1 | 12/2009 | Burke | |
| 7,627,617 B2 | 12/2009 | Kavuri et al. | |
| 7,631,151 B2 | 12/2009 | Prahlad et al. | |
| 7,634,478 B2 | 12/2009 | Yang | |
| 7,657,550 B2 | 2/2010 | Prahlad et al. | |
| 7,660,800 B2 | 2/2010 | Prahlad et al. | |
| 7,660,807 B2 | 2/2010 | Prahlad et al. | |
| 7,668,798 B2 | 2/2010 | Scanlon et al. | |
| 7,668,884 B2 | 2/2010 | Prahlad et al. | |
| 7,672,962 B2 | 3/2010 | Arrouye | |
| 7,693,856 B2 | 4/2010 | Arrouye | |
| 7,707,178 B2 | 4/2010 | Prahlad et al. | |
| 7,711,700 B2 | 5/2010 | Prahlad et al. | |
| 7,716,171 B2 | 5/2010 | Kryger | |
| 7,716,191 B2 | 5/2010 | Blumenau et al. | |
| 7,720,801 B2 | 5/2010 | Chen | |
| 7,725,605 B2 | 5/2010 | Palmeri | |
| 7,725,671 B2 | 5/2010 | Prahlad et al. | |
| 7,734,593 B2 | 6/2010 | Prahlad et al. | |
| 7,734,669 B2 | 6/2010 | Kottomtharayil | |
| 7,734,715 B2 | 6/2010 | Hyakutake et al. | |
| 7,747,579 B2 | 6/2010 | Prahlad et al. | |
| 7,756,837 B2 | 7/2010 | Williams | |
| 7,801,864 B2 | 9/2010 | Prahlad et al. | |
| 7,818,215 B2 | 10/2010 | King | |
| 7,822,749 B2 | 10/2010 | Prahlad et al. | |
| 7,831,553 B2 | 11/2010 | Prahlad et al. | |
| 7,831,622 B2 | 11/2010 | Prahlad et al. | |
| 7,831,795 B2 | 11/2010 | Prahlad et al. | |
| 7,840,537 B2 | 11/2010 | Gokhale | |
| 7,840,619 B2 | 11/2010 | Horn | |
| 7,849,059 B2 | 12/2010 | Prahlad et al. | |
| 7,860,968 B2* | 12/2010 | Bornhoevd et al. | 709/224 |
| 7,882,077 B2 | 2/2011 | Gokhale | |
| 7,882,098 B2 | 2/2011 | Prahlad | |
| 7,890,467 B2 | 2/2011 | Watanabe | |
| 7,890,469 B1 | 2/2011 | Maionchi | |
| 7,925,856 B1 | 4/2011 | Greene | |
| 7,933,920 B2 | 4/2011 | Kojima | |
| 7,937,365 B2 | 5/2011 | Prahlad | |
| 7,937,393 B2 | 5/2011 | Prahlad | |
| 7,953,945 B2 | 5/2011 | Bender et al. | |
| 7,962,709 B2 | 6/2011 | Agrawal | |
| 7,966,495 B2 | 6/2011 | Ackerman | |
| 8,006,125 B1* | 8/2011 | Meng et al. | 714/6.12 |
| 8,010,769 B2 | 8/2011 | Prahlad et al. | |
| 8,037,031 B2 | 10/2011 | Gokhale | |
| 8,041,677 B2 | 10/2011 | Sumner et al. | |
| 8,051,045 B2 | 11/2011 | Vogler | |
| 8,051,095 B2 | 11/2011 | Prahlad et al. | |
| 8,055,650 B2 | 11/2011 | Scanlon | |
| 8,055,745 B2 | 11/2011 | Atluri | |
| 8,086,569 B2 | 12/2011 | Jasrasaria | |
| 8,117,196 B2 | 2/2012 | Jones et al. | |
| 8,131,680 B2 | 3/2012 | Prahlad et al. | |
| 8,131,725 B2 | 3/2012 | Prahlad et al. | |
| 8,140,786 B2 | 3/2012 | Bunte | |
| 8,170,995 B2 | 5/2012 | Prahlad | |
| 8,190,571 B2 | 5/2012 | Sen | |
| 8,219,524 B2 | 7/2012 | Gokhale | |
| 8,229,954 B2 | 7/2012 | Kottomtharayil et al. | |
| 8,234,249 B2 | 7/2012 | Prahlad et al. | |
| 8,271,548 B2 | 9/2012 | Prahlad et al. | |
| 8,285,685 B2 | 10/2012 | Prahlad et al. | |
| 8,285,964 B2 | 10/2012 | Brockway | |
| 8,352,472 B2 | 1/2013 | Prahlad et al. | |
| 8,401,996 B2 | 3/2013 | Muller | |
| 8,442,983 B2 | 5/2013 | Pawar | |
| 8,725,737 B2 | 5/2014 | Prahlad et al. | |
| 2001/0047365 A1 | 11/2001 | Yonaitis | |
| 2002/0004883 A1 | 1/2002 | Nguyen et al. | |
| 2002/0049626 A1 | 4/2002 | Mathias et al. | |
| 2002/0049738 A1 | 4/2002 | Epstein | |
| 2002/0069324 A1 | 6/2002 | Gerasimov et al. | |
| 2002/0083055 A1 | 6/2002 | Pachet et al. | |
| 2002/0087550 A1 | 7/2002 | Carlyle et al. | |
| 2002/0120741 A1 | 8/2002 | Webb et al. | |
| 2002/0124137 A1 | 9/2002 | Ulrich et al. | |
| 2002/0133476 A1 | 9/2002 | Reinhardt | |
| 2002/0147734 A1 | 10/2002 | Shoup et al. | |
| 2002/0161753 A1 | 10/2002 | Inaba et al. | |
| 2002/0174107 A1 | 11/2002 | Poulin | |
| 2002/0181395 A1 | 12/2002 | Foster et al. | |
| 2003/0005119 A1 | 1/2003 | Mercier et al. | |
| 2003/0018607 A1 | 1/2003 | Lennon et al. | |
| 2003/0023893 A1 | 1/2003 | Lee et al. | |
| 2003/0046313 A1 | 3/2003 | Leung | |
| 2003/0079018 A1 | 4/2003 | Lolayekar et al. | |
| 2003/0101183 A1 | 5/2003 | Kabra et al. | |
| 2003/0115219 A1 | 6/2003 | Chadwick | |
| 2003/0120625 A1 | 6/2003 | Jackson et al. | |
| 2003/0130993 A1 | 7/2003 | Mendelevitch et al. | |
| 2003/0161338 A1 | 8/2003 | Ng et al. | |
| 2003/0163652 A1 | 8/2003 | Tsuge | |
| 2003/0182583 A1 | 9/2003 | Turco | |
| 2004/0003078 A1 | 1/2004 | Todd et al. | |
| 2004/0003132 A1 | 1/2004 | Stanley et al. | |
| 2004/0006572 A1 | 1/2004 | Hoshino et al. | |
| 2004/0010493 A1 | 1/2004 | Kojima et al. | |
| 2004/0015468 A1 | 1/2004 | Beier et al. | |
| 2004/0015514 A1 | 1/2004 | Melton et al. | |
| 2004/0078632 A1 | 4/2004 | Infante et al. | |
| 2004/0128269 A1* | 7/2004 | Milligan et al. | 707/1 |
| 2004/0128276 A1 | 7/2004 | Scanlon et al. | |
| 2004/0139059 A1 | 7/2004 | Conroy et al. | |
| 2004/0225437 A1 | 11/2004 | Endo et al. | |
| 2004/0254919 A1 | 12/2004 | Giuseppini | |
| 2004/0255161 A1 | 12/2004 | Cavanaugh | |
| 2004/0260678 A1 | 12/2004 | Verbowski et al. | |
| 2004/0260973 A1 | 12/2004 | Michelman | |
| 2005/0010588 A1 | 1/2005 | Zalewski | |
| 2005/0021537 A1 | 1/2005 | Brendle et al. | |
| 2005/0037367 A9 | 2/2005 | Fiekowsky et al. | |
| 2005/0050075 A1 | 3/2005 | Okamoto et al. | |
| 2005/0055352 A1 | 3/2005 | White | |
| 2005/0055386 A1 | 3/2005 | Tosey | |
| 2005/0065961 A1 | 3/2005 | Aguren | |

(56) References Cited

U.S. PATENT DOCUMENTS

| | | |
|---|---|---|
| 2005/0086231 A1 | 4/2005 | Moore |
| 2005/0097126 A1 | 5/2005 | Cabrera et al. |
| 2005/0114406 A1 | 5/2005 | Borthakur et al. |
| 2005/0120021 A1 | 6/2005 | Tang et al. |
| 2005/0154695 A1 | 7/2005 | Gonzalez et al. |
| 2005/0182773 A1 | 8/2005 | Feinsmith |
| 2005/0182797 A1 | 8/2005 | Adkins et al. |
| 2005/0188109 A1 | 8/2005 | Shiga et al. |
| 2005/0188248 A1 | 8/2005 | O'Brien et al. |
| 2005/0193128 A1 | 9/2005 | Dawson et al. |
| 2005/0198559 A1 | 9/2005 | Fujiwara |
| 2005/0203964 A1 | 9/2005 | Matsunami et al. |
| 2005/0216453 A1 | 9/2005 | Sasaki et al. |
| 2005/0228794 A1 | 10/2005 | Navas et al. |
| 2005/0228875 A1 | 10/2005 | Monitzer et al. |
| 2005/0246311 A1 | 11/2005 | Whelan et al. |
| 2005/0246376 A1 | 11/2005 | Lu et al. |
| 2005/0257083 A1 | 11/2005 | Cousins |
| 2005/0262097 A1 | 11/2005 | Sim-Tang et al. |
| 2005/0283504 A1* | 12/2005 | Suzuki et al. ............ 707/202 |
| 2005/0289193 A1 | 12/2005 | Arrouye et al. |
| 2006/0004820 A1 | 1/2006 | Claudatos et al. |
| 2006/0010227 A1 | 1/2006 | Atluri |
| 2006/0010341 A1 | 1/2006 | Kodama |
| 2006/0015524 A1 | 1/2006 | Gardiner et al. |
| 2006/0031225 A1 | 2/2006 | Palmeri et al. |
| 2006/0031263 A1 | 2/2006 | Arrouye et al. |
| 2006/0031287 A1 | 2/2006 | Ulrich et al. |
| 2006/0092861 A1 | 5/2006 | Corday et al. |
| 2006/0101285 A1 | 5/2006 | Chen et al. |
| 2006/0106814 A1 | 5/2006 | Blumenau et al. |
| 2006/0107089 A1 | 5/2006 | Jansz et al. |
| 2006/0171315 A1 | 8/2006 | Choi et al. |
| 2006/0195449 A1 | 8/2006 | Hunter et al. |
| 2006/0215564 A1 | 9/2006 | Breitgand et al. |
| 2006/0224846 A1 | 10/2006 | Amarendran et al. |
| 2006/0253495 A1 | 11/2006 | Png |
| 2006/0259468 A1 | 11/2006 | Brooks et al. |
| 2006/0259527 A1 | 11/2006 | Devarakonda |
| 2006/0259724 A1 | 11/2006 | Saika |
| 2006/0277154 A1 | 12/2006 | Lunt et al. |
| 2006/0294094 A1 | 12/2006 | King et al. |
| 2007/0027861 A1 | 2/2007 | Huentelman et al. |
| 2007/0027929 A1 | 2/2007 | Whelan |
| 2007/0033191 A1 | 2/2007 | Hornkvist et al. |
| 2007/0043956 A1 | 2/2007 | El Far et al. |
| 2007/0055737 A1 | 3/2007 | Yamashita et al. |
| 2007/0067304 A1 | 3/2007 | Ives |
| 2007/0100867 A1 | 5/2007 | Celik et al. |
| 2007/0112809 A1 | 5/2007 | Arrouye et al. |
| 2007/0130373 A1 | 6/2007 | Kalwitz |
| 2007/0179995 A1 | 8/2007 | Prahlad et al. |
| 2007/0185914 A1 | 8/2007 | Prahlad et al. |
| 2007/0185915 A1 | 8/2007 | Prahlad et al. |
| 2007/0185916 A1 | 8/2007 | Prahlad et al. |
| 2007/0185917 A1 | 8/2007 | Prahlad et al. |
| 2007/0185939 A1 | 8/2007 | Prahland et al. |
| 2007/0192360 A1 | 8/2007 | Prahlad et al. |
| 2007/0192385 A1 | 8/2007 | Prahlad et al. |
| 2007/0198570 A1 | 8/2007 | Prahlad et al. |
| 2007/0198593 A1 | 8/2007 | Prahlad et al. |
| 2007/0198601 A1 | 8/2007 | Prahlad et al. |
| 2007/0198608 A1 | 8/2007 | Prahlad et al. |
| 2007/0198611 A1 | 8/2007 | Prahlad et al. |
| 2007/0198613 A1 | 8/2007 | Prahlad et al. |
| 2007/0203937 A1 | 8/2007 | Prahlad et al. |
| 2007/0203938 A1 | 8/2007 | Prahlad et al. |
| 2007/0256003 A1 | 11/2007 | Wagoner et al. |
| 2007/0260609 A1 | 11/2007 | Tulyani |
| 2007/0266032 A1 | 11/2007 | Blumenau |
| 2007/0282680 A1 | 12/2007 | Davis et al. |
| 2007/0288536 A1 | 12/2007 | Sen et al. |
| 2008/0021921 A1 | 1/2008 | Horn |
| 2008/0059515 A1 | 3/2008 | Fulton |
| 2008/0077594 A1 | 3/2008 | Ota |
| 2008/0091655 A1 | 4/2008 | Gokhale et al. |
| 2008/0091747 A1 | 4/2008 | Prahlad |
| 2008/0147878 A1 | 6/2008 | Kottomtharayil et al. |
| 2008/0183662 A1 | 7/2008 | Reed |
| 2008/0205301 A1 | 8/2008 | Burton et al. |
| 2008/0228771 A1 | 9/2008 | Prahlad et al. |
| 2008/0243796 A1 | 10/2008 | Prahlad et al. |
| 2008/0249996 A1 | 10/2008 | Prahlad et al. |
| 2008/0250178 A1 | 10/2008 | Haustein et al. |
| 2008/0263029 A1 | 10/2008 | Guha et al. |
| 2008/0294605 A1 | 11/2008 | Prahlad et al. |
| 2009/0113056 A1 | 4/2009 | Tameshige et al. |
| 2009/0172333 A1 | 7/2009 | Marcu et al. |
| 2009/0287665 A1 | 11/2009 | Prahlad et al. |
| 2009/0319534 A1 | 12/2009 | Gokhale |
| 2010/0057870 A1 | 3/2010 | Ahn et al. |
| 2010/0082672 A1 | 4/2010 | Kottomtharayil |
| 2010/0114952 A1 | 5/2010 | Scanlon et al. |
| 2010/0131461 A1 | 5/2010 | Prahlad et al. |
| 2010/0131467 A1 | 5/2010 | Prahlad et al. |
| 2010/0179941 A1 | 7/2010 | Agrawal |
| 2010/0205150 A1 | 8/2010 | Prahlad et al. |
| 2010/0211571 A1 | 8/2010 | Prahlad et al. |
| 2010/0257179 A1 | 10/2010 | Arrouye et al. |
| 2010/0299490 A1 | 11/2010 | Attarde |
| 2011/0016163 A1 | 1/2011 | Prahlad et al. |
| 2011/0047180 A1 | 2/2011 | Prahlad et al. |
| 2011/0078146 A1 | 3/2011 | Prahlad et al. |
| 2011/0178986 A1 | 7/2011 | Prahlad |
| 2011/0181383 A1 | 7/2011 | Lotfi et al. |
| 2012/0030432 A1 | 2/2012 | Kottomtharayil et al. |
| 2012/0072695 A1 | 3/2012 | Kottomtharayil et al. |
| 2012/0173531 A1 | 7/2012 | Prahlad et al. |
| 2012/0215745 A1 | 8/2012 | Prahlad |
| 2012/0254115 A1 | 10/2012 | Varadharajan |
| 2012/0271832 A1 | 10/2012 | Prahlad |
| 2013/0013609 A1 | 1/2013 | Prahlad et al. |
| 2013/0110790 A1 | 5/2013 | Matsumoto et al. |
| 2013/0151640 A1 | 6/2013 | Ahn et al. |
| 2013/0198221 A1 | 8/2013 | Roark et al. |

FOREIGN PATENT DOCUMENTS

| | | |
|---|---|---|
| EP | 0 467 546 | 1/1992 |
| EP | 0 774 715 | 5/1997 |
| EP | 0 809 184 | 11/1997 |
| EP | 0 899 662 | 3/1999 |
| EP | 0 981 090 | 2/2000 |
| EP | 1174795 | 1/2002 |
| WO | WO 94/12944 | 6/1994 |
| WO | 95/13580 | 5/1995 |
| WO | 99/12098 | 3/1999 |
| WO | WO 99/14692 | 3/1999 |
| WO | WO 0106368 | 1/2001 |
| WO | WO 0193537 | 12/2001 |
| WO | WO 03/060774 | 7/2003 |
| WO | WO 2004/010375 | 1/2004 |
| WO | WO 2004/063863 | 1/2004 |
| WO | WO 2005/055093 | 6/2005 |
| WO | WO 2007/062254 | 5/2007 |
| WO | WO 2007/062429 | 5/2007 |
| WO | WO 2008/049023 | 4/2008 |

OTHER PUBLICATIONS

Arneson, "Mass Storage Archiving in Network Environments," *IEEE*, 1998, pp. 45-50.

Cabrera et al., "ADSM: A Multi-Platform, Scalable, Backup and Archive Mass Storage System," *Digest of Papers of the Computer Society Conference, IEEE* Comp. Soc. Press, Vol. Conf. (Mar. 5, 1995), pp. 420-427.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Rosenblum et al., "The Design and Implementation of a Log-Structure File System," *Operating Systems Review SIGOPS*, vol. 25, No. 5, New York, US, pp. 1-15 (May 1991).

(56) References Cited

OTHER PUBLICATIONS

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and the recitation in claim 5).
Farley, M., "Storage Network Fundamentals,, Network Backup: The Foundation of Storage Management, Data Management," Storage Networking Fundamentals: an Introduction to Storage Devices, Subsystems, Applications, Management, and Filing [File] Systems, Cisco Press, Jan. 1, 2005, 9 pages.
Examination Report for EP06844595.6 dated Sep. 26, 2008, 5 pages.
International Search Report and Preliminary Report on Patentability dated Jun. 3, 2008, PCT/US2006/045556.
Bhagwan, R. et al. "Total Recall: System Support for Automated Availability Management," Proceedings of the 1st Conference on Symposium on Networked Systems Design and Implementation, vol. 1, Mar. 3, 2004, XP055057350, Berkeley, CA, 14 pages.
Bowman et al. "Harvest: A Scalable, Customizable Discovery and Access System," Department of Computer Science, University of Colorado—Boulder, Revised Mar. 1995, 29 pages.
Harrison, CDIA Training & Test Preparation Guide 2000, Specialized Solutions, 3 pages.
Manber et al., "WebGlimpse—Combining Browsing and Searching," 1997 Usenix Technical Conference, Jan. 1997, 12 pages.
Quick Reference Guide for West and EAST [date unknown, but verified as of Sep. 13, 2007], Search and Information Resource Administration, 2 pages.
Titus Labs—Announces Document Classification for Microsoft Word, Nov. 3, 2005, XP55034835, available at http://web.archive.org/web/20051126093136/http://www.titus-labs.com/about/DocClassRelease.html, 1 page.
Titus Labs Document Classification V1.1 for Microsoft Word—Document Policy Enforcement, available at: <http://web.archive.org/web/20060104112621/www.titus-labs.com/includes/PDF/DocClassDataSheet.pdf>, Nov. 3, 2005, 2 pages.
User's Manual for the Examiners Automated Search Tool (EAST) Jul. 22, 1999, Version 1.0, 179 pages.
International Search Report and Written Opinion for International Application No. PCT/US07/81681, Mail Date Nov. 13, 2009, 8 pages.
PCT International Search Report and Written Opinion for International Application No. PCT/US07/81681, Mail Date Oct. 20, 2008, 11 pages.
International Search Report and Written Opinion for International Application No. PCT/US10/62069, Mail Date Mar. 7, 2011, 7 pages.
Supplementary European Search Report for European Application No. EP07844364, Mail Date Apr. 19, 2011, 9 pages.
Extended European Search Report for European Application No. EP11003795, Mail Date Nov. 21, 2012, 20 pages.
"Text Figures," retrieved from http://www.microsoft.com/msj/1198.ntfs/ntfstextfigs.htm on Nov. 10, 2005, 7 pages.
Arneson, "Mass Storage Archiving in Network Environments" IEEE, 1998, pp. 45-50.
Cooperstein et al., "Keeping an Eye on Your NTFS Drives: The Windows 2000 Change Journal Explained," Sep. 1999, retrieved from http://www.microsoft.com/msj/0999/journal/journal.aspx on Nov. 10, 2005, 17 pages.
EMC Corporation, "Today's Choices for Business Continuity," 2004, 12 pages.
http://en.wikipedia.org/wiki/Machine_learning, Jun. 1, 2010.
Karl Langdon et al., "Data Classification: Getting Started," Storage Magazine, Jul. 2005, retrieved from http://storagemagazine.techtarget.com/magPrintFriendly/0,293813,sid35_gci1104445,00.html; on Aug. 25, 2005, 3 pages.
Microsoft, "GetFileAttributesEx," updated Sep. 2005, retrieved from http://msdn.microsoft.com/library/en-us/fileio/fs/getfileattributesex.asp?frame=true on Nov. 10, 2005, 2 pages.
Microsoft, "WIN32_File_Attribute_Data," updated Sep. 2005, retrieved from http://msdn.microsoft.com/library/en-us/fileio/fs/win32_file_attribute_data_str.asp?frame on Nov. 10, 2005, 3 pages.
O'Neill, "New Tools to Classify Data," Storage Magazine, Aug. 2005, retrieved from http://storagemagazine.techtarget.com/magPrintFriendly/0,293813,sid35_gci1114703,00.html on Aug. 25, 2005, 4 pages.
Richter et al., "A File System for the 21st Century: Previewing the Windows NT 5.0 Files System," Nov. 1998, retrieved from http://www.microsoft.com/msj/1198/ntfs/ntfs.aspx on Nov. 10, 2005, 17 pages.
Summons to attend oral proceedings dated May 2, 2011.
Szor, The Art of Virus Research and Defense, Symantec Press (2005) ISBN 0-321-30454-3.
Witten et al., Data Mining: Practical Machine Learning Tools and Techniques, Ian H. Witten & Eibe Frank, Elsevier (2005) ISBN 0-12-088407-0.
Search Report for European Application No. 06 844 595.6, Mail Date: Sep. 26, 2008, 5 pages.
Decision to refuse a European Patent Application for Application No. EP 06844595.6, dated Oct. 12, 2011.
Partial International Search Results, PCT/US2006/045556 dated May 25, 2007, 2 pages.
International Search Report and Preliminary Report on Patentability, PCT/US2006/045556, dated Jul. 17, 2007.
Australian Examination Report dated Feb. 28, 2011, Application No. 2006318338.
Office Action in Canadian Application No. 2631197 dated Dec. 28, 2011.

\* cited by examiner

US 8,930,496 B2

SYSTEMS AND METHODS OF UNIFIED RECONSTRUCTION IN STORAGE SYSTEMS

RELATED APPLICATIONS

This application claims benefit from Provisional Application No. 60/752,202, filed Dec. 19, 2005, which is incorporated by reference herein.

This application is also related to the following patents and pending applications, each of which is hereby incorporated herein by reference in its entirety:

application Ser. No. 09/354,058, titled HIERARCHICAL BACKUP AND RETRIEVAL SYSTEM, filed Jul. 15, 1999;

U.S. Pat. No. 7,035,880, titled MODULAR BACKUP AND RETRIEVAL SYSTEM USED IN CONJUNCTION WITH A STORAGE AREA NETWORK, filed Jul. 6, 2000;

U.S. Pat. No. 6,418,478, titled PIPELINED HIGH SPEED DATA TRANSFER MECHANISM, issued Jul. 9, 2002;

Application Ser. No. 60/460,234, SYSTEM AND METHOD FOR PERFORMING STORAGE OPERATIONS IN A COMPUTER NETWORK, filed Apr. 3, 2003; and related applications including Ser. Nos. 10/818,794, 10/819,097, and 10/819,101, all filed Apr. 5, 2004; and application Ser. No. 10/877,831, HIERARCHICAL SYSTEM AND METHOD FOR PERFORMING STORAGE OPERATIONS IN A COMPUTER NETWORK, filed Jun. 25, 2004.

Application Ser. No. 60/519,526, SYSTEM AND METHOD FOR PERFORMING PIPELINED STORAGE OPERATIONS INA COMPUTER NETWORK, filed Nov. 13, 2003, related applications including Ser. Nos. 10/990,284 and 10/990,357 both filed Nov. 15, 2004; and application Ser. No. 11/120,619, HIERARCHICAL SYSTEMS AND METHODS FOR PROVIDING STORAGE A UNIFIED VIEW OF STORAGE INFORMATION, filed May 2, 2005.

Application Ser. No. 60/753,203 titled "Systems and Methods for Classifying and Transferring Information in a Storage Network," filed Dec. 19, 2005.

Application Ser. No. 60/752,202 titled "Systems and Methods for Granular Resource Management in a Storage Network," filed Dec. 19, 2005.

Application Ser. No. 11/313,224 titled "Systems and Methods for Performing Multi-Path Storage Operations," filed Dec. 19, 2005.

Application Ser. No. 60/752,196 titled "Systems and Methods for Migrating Components in a Hierarchical Storage Network".

Application Ser. No. 60/752,201 titled "Systems and Methods for Resynchronizing Storage Operations" filed Dec. 19, 2005.

Application Ser. No. 60/752,197 titled "Systems and Methods for Hierarchical Client Group Management" filed Dec. 19, 2005.

BACKGROUND OF THE INVENTION

The invention disclosed herein relates generally to performing storage operations on electronic data in a computer network. More particularly, the present invention relates to managing metadata in a storage operation system.

Storage management systems have evolved over time into complex entities with many components including hardware and software modules designed to perform a variety of different storage operations on electronic data. Current storage management systems employ a number of different methods to perform storage operations on electronic data. For example, data can be stored in primary storage as a primary copy or in secondary storage as various types of secondary copies including, as a backup copy, a snapshot copy, a hierarchical storage management copy ("HSM"), as an archive copy, and as other types of copies.

A primary copy of data is generally a production copy or other "live" version of the data which is used by a software application and is typically in the native format of that application. Primary copy data may be maintained in a local memory or other high-speed storage device that allows for relatively fast data access. Such primary copy data is typically retained for a period of time (e.g., a number of seconds, minutes, hours or days) before some or all of the data is stored as one or more secondary copies, for example, to prevent loss of data in the event a problem occurs with the data stored in primary storage.

Secondary copies may include point-in-time data and may be intended for long-term retention (e.g., weeks, months or years depending on retention criteria, for example as specified in a storage policy as further described herein) before some or all of the data is moved to other storage or discarded. Secondary copies may be indexed so users can browse and restore the data at another point in time. After certain primary copy data is copied to secondary storage, a pointer or other location indicia such as a stub may be placed in the primary copy to indicate the current location of that data.

One type of secondary copy is a backup copy. A backup copy is generally a point-in-time copy of the primary copy data stored in a backup format as opposed to in native application format. For example, a backup copy may be stored in a backup format that is optimized for compression and efficient long-term storage. Backup copies generally have relatively long retention periods and may be stored on media with slower retrieval times than other types of secondary copies and media. In some cases, backup copies may be stored at an offsite location.

Another form of secondary copy is a snapshot copy. From an end-user viewpoint, a snapshot may be thought of as a representation or image of the primary copy data at a given point in time. A snapshot generally creates a bit map or block level representation of a primary copy volume at a particular moment in time. Users typically gain a read-only access to the record of files and directories of the snapshot. By electing to restore primary copy data from a snapshot taken at a given point in time, users may also return the current file system to the prior state of the file system that existed when the snapshot was taken.

A snapshot may be created instantly, using a minimum of file space, but may still function as a conventional file system backup. A snapshot may not actually create another physical copy of all the data, but may simply create pointers that are mapped to specific blocks of data taken at the point in time of the snapshot.

Another type of data generated by client computer systems and their associated networks is metadata. Metadata includes information, or data, about the data stored on the system. Metadata, while not including the substantive operational data of client applications is useful in the administration, security, maintenance, and accessibility of operational data. Examples of metadata include files size, edit times, edit dates, locations on storage devices, version numbers, encryption codes, restrictions on access or uses, and tags of information that may include an identifier for users or clients, etc.

Whether data is stored in primary or secondary storage, it may have metadata or other associated data useful for application or network management. Such metadata may be created by applications operating on different platforms and may be stored or backed up to storage devices that serve different and distinct storage domains. Thus, if it is desired to obtain metadata or other data relating to a particular application across a network or several clients (e.g., to obtain a collective or aggregate "unified view" of the data), it may be necessary to communicate with the various network devices to identify and collect the relevant metadata for use as an aid in system maintenance and administration.

SUMMARY OF THE INVENTION

In accordance with certain aspects of the present invention, systems and methods for identifying and merging data in an electronic storage network are provided which may include the identification, collection, creation, and use of metadata stored centrally within the system. The metadata may be generated by a group of storage operation cells during storage operations within the network. Such metadata is used to reconstruct client, application, or system data throughout the storage operation network that may be missing, deleted, corrupt or otherwise incomplete or inaccurate.

An embodiment of the present invention includes a system for reconstructing and maintaining data stored in an electronic storage network. The system may include a plurality of storage operation cells interconnected on the network. One of the storage operation cells may include a master storage manager that maintains data related to client applications or system management. The master storage manager may collect the data generated by a plurality of storage operation cells and stores the data on one or more storage devices.

In another embodiment of the present invention, a method for reconstructing and maintaining client or system data stored in an electronic storage network is provided. The method may include identifying and collecting data stored in a group of storage operation cells. The collected data may be stored in a central storage location, wherein the data stored in the central storage location represents a collection of integrated data obtained from various locations across the electronic storage network.

In yet another embodiment a method of reconstructing data stored in an electronic storage network is presented. The method may include identifying metadata associated with an interruption of data transfer between first and second storage devices to determine if data present at one of the storage devices is not present at the other fault and collecting backup metadata from a storage device.

In another embodiment of the present invention, a computer-readable medium having sequences of instructions which, when executed by one or more processors cause an electronic device to assign unique identifiers to a sets of metadata generated by storage operation cells, each linked to a local storage device. It may determined whether a backup storage device includes a hardware identifier, if not, one is added to unique identifier. The sets of metadata, may then be stored in a central storage device. Upon detection of a loss of metadata on the local storage device, a corresponding set of metadata is located on the central storage device using the unique identifier. The lost metadata may be reconstructed using a corresponding set of metadata on a storage device. The reconstructed metadata may be copied on to the local storage device for subsequent use.

BRIEF DESCRIPTION OF THE DRAWINGS

Aspects of the invention are illustrated in the figures of the accompanying drawings which are meant to be exemplary and not limiting, in which like references are intended to refer to like or corresponding parts, and in which.

DETAILED DESCRIPTION

Figure 1A:
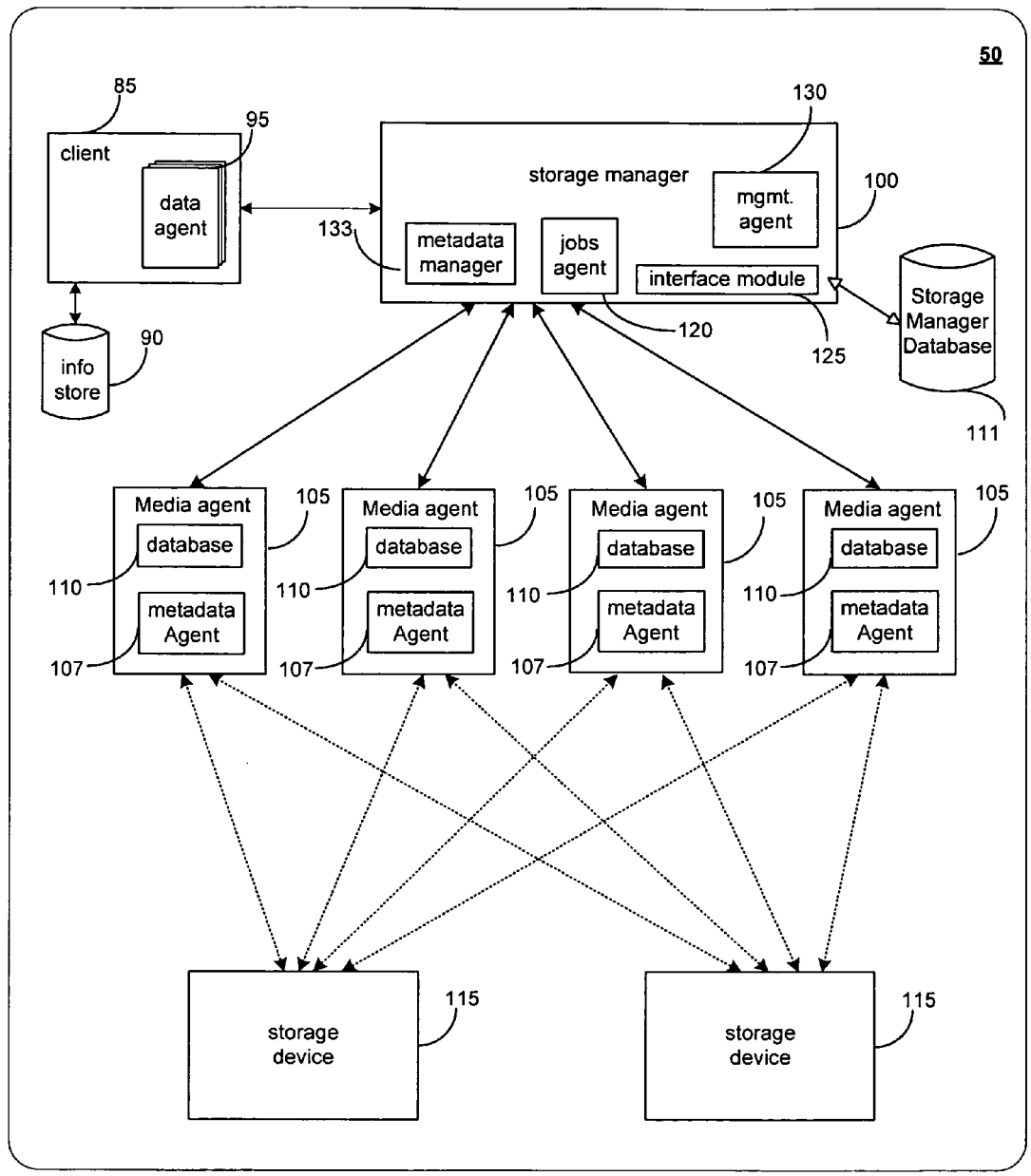
FIG. 1A is a block diagram of a storage operation cell according to an embodiment of the invention.

Detailed embodiments of the present invention are disclosed herein, however, it is to be understood that the disclosed embodiments are merely exemplary of the invention, which may be embodied in various forms. Therefore, specific functional details disclosed herein are not to be interpreted as limiting, but merely as a basis for teaching one skilled in the art to employ the present invention in broad spectrum of more specific detailed embodiments.

With reference to FIGS. 1 through 9, exemplary aspects of certain features of the present invention are presented. FIG. 1A illustrates a block diagram of a storage operation cell 50 that performs storage operations on electronic data in a computer network in accordance with an embodiment of the present invention. Storage operation cell 50 may also be referred to herein as a storage domain. As shown, storage operation cell 50 may generally include a storage manager 100, a data agent 95, a media agent 105, a storage device 115, and, in some embodiments, may include certain other components such as a client 85, a data or information store 90, databases 110 and 111, jobs agent 120, an interface module 125, a management agent 130, and metadata manger 133. Such system and elements thereof are exemplary of a modular storage management system such as the CommVault QiNetix™ system, and also the CommVault GALAXY™ backup system, available from CommVault Systems, Inc. of Oceanport, N.J., and further described in U.S. Pat. No. 7,035,880, which is incorporated herein by reference in its entirety.

A storage operation cell 50, in one embodiment, may generally include combinations of hardware and software components associated with performing storage operations on electronic data including the logical association of physical components within the system (e.g., for administrative or convenience purposes). Exemplary storage operation cells according to embodiments of the invention may include, as further described herein, CommCells as embodied in the QNet storage management system and the QiNetix storage management system by CommVault Systems of Oceanport, N.J. According to some embodiments of the invention, storage operations cell 50 may be related to backup cells and provide some or all of the functionality of backup cells as described in application Ser. No. 09/354,058.

Storage operation cells may also perform additional types of storage operations and other types of storage management functions that are not generally offered by backup cells. In accordance with certain embodiments of the present invention, additional storage operations performed by storage operation cells may include creating, storing, retrieving, and migrating primary data copies and secondary data copies (which may include, for example, snapshot copies, backup copies, HSM copies, archive copies, and other types of copies of electronic data). In some embodiments, storage operation cells may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In some embodiments, storage operations may be performed according to a storage policy. A storage policy, generally, may be a data structure or other information source that includes a set of preferences and other storage criteria for performing a storage operation. The preferences and storage criteria may include, but are not limited to, a storage location, relationships between system components, network pathway to utilize, retention policies, data characteristics, compression or encryption requirements, preferred system components to utilize in a storage operation, and other criteria relating to a storage operation.

Thus, a storage policy may indicate that certain data is to be stored in a specific storage device, retained for a specified period of time before being aged to another tier of secondary storage, copied to secondary storage using a specified number of streams, etc. In one embodiment, a storage policy may be stored to a storage manager database 111, to archive media as metadata for use in restore operations or other storage operations. The storage policy may be stored to other locations or components of the system.

A schedule policy specifies when and how often to perform storage operations and may also specify performing certain storage operations on sub-clients of data including how to handle those sub-clients. A sub-client may represent static or dynamic associations of portions of data of a volume and are generally mutually exclusive. Thus, a portion of data may be given a label and the association is stored as a static entity in an index, database or other storage location used by the system. Sub-clients may also be used as an effective administrative scheme of organizing data according to data type, department within the enterprise, storage preferences, etc. For example, an administrator may find it preferable to separate e-mail data from financial data using two different sub-clients having different storage preferences, retention criteria, etc. Storage operation cells may contain not only physical devices, but also may represent logical concepts, organizations, and hierarchies. For example, a first storage operation cell 50 may be configured to perform HSM operations, such as data backup or other types of data migration, and may include a variety of physical components including a storage manager 100 (or management agent 130), a media agent 105, a client component 85, and other components as described herein. A second storage operation cell may contain the same or similar physical components, however, it may be configured to perform storage resource management ("SRM") operations, such as monitoring a primary data copy or performing other known SRM operations.

While the first and second storage operation cells are logically distinct entities configured to perform different management functions (i.e., HSM and SRM respectively), each cell may contain the same or similar physical devices in both storage operation cells. In an alternative embodiment, different storage operation cells may contain some of the same physical devices and not others. For example, a storage operation cell 50 configured to perform SRM tasks may include a media agent 105, client 85, or other network device connected to a primary storage volume, while a storage operation cell 50 configured to perform HSM tasks instead may include a media agent 105, client 85, or other network device connected to a secondary storage volume and not contain the elements or components associated with the primary storage volume. These two cells, in this embodiment, may include a different storage manager 100 that coordinates storage operations via the same media agents 105 and storage devices 115. This "overlapping" configuration may allow storage resources to be accessed by more than one storage manager 100 such that multiple paths exist to each storage device 115 facilitating failover, load balancing and promoting robust data access via alternative routes.

Alternatively, in another embodiment, a single storage manager 100 may control two or more cells 50 (whether or not each storage cell 50 has its own dedicated storage manager 100). Moreover, in certain embodiments, the extent or type of overlap may be user-defined (through a control console (not shown)) or may be automatically configured to optimize data storage and/or retrieval.

In one embodiment, a data agent 95 may be a software module or part of a software module that is generally responsible for archiving, migrating, and recovering data from client computer 85 stored in an information store 90 or other memory location. Each client computer 85 may have at least one data agent 95 and the system can support multiple client computers 85. In some embodiments, data agents 95 may be distributed between client 85 and storage manager 100 (and any other intermediate components (not shown)) or may be deployed from a remote location or its functions approximated by a remote process that performs some or all of the functions of data agent 95. Data agent 95 may also generate metadata associated with the data that it is generally responsible for archiving, migrating, and recovering from client computer 85. This metadata may be appended or imbedded within the client data as it is transferred to a backup or secondary storage location under the direction of storage manager 100.

In one embodiment, the storage manager 100 may include a software module or other application that may coordinate and control storage operations performed by storage operation cell 50. The storage manager 100 may communicate with the elements of the storage operation cell 50 including client computers 85, data agents 95, media agents 105, and storage devices 115, to initiate and manage system backups, migrations, and data recovery.

In one embodiment of the present invention, the storage manager 100 may include a jobs agent 120 that monitors the status of some or all storage operations previously performed, currently being performed, or scheduled to be performed by the storage operation cell 50. Jobs agent 120 may be linked with agent, or an interface module 125 (typically a software module or application). The interface module 125 may include information processing and display software, such as a graphical user interface ("GUI"), an application program interface ("API"), or other interactive interface through which users and system processes can retrieve information about the status of storage operations.

Through interface module 125, users may optionally issue instructions to various storage operation cells 50 regarding performance of the storage operations as described and contemplated by illustrative embodiments of the present invention. For example, a user may utilize the GUI to view the status of pending storage operations in some or all of the storage operation cells in a given network or to monitor the status of certain components in a particular storage operation cell (e.g., the amount of storage capacity left in a particular storage device).

One embodiment of storage manager 100 may also include a management agent 130 that is typically implemented as a software module or application program. A management agent 130 provides an interface that allows various management components in other storage operation cells 50 to communicate with one another. For example, one embodiment of a network configuration may include multiple cells 50 adjacent to one another or otherwise logically related in a WAN or LAN configuration (not shown). With this arrangement, each cell 50 may be connected to the other through each respective interface module 125. This allows each cell 50 to send and receive certain pertinent information from other cells 50 including status information, routing information, information regarding capacity and utilization, etc. These communication paths may also be used to convey information and instructions regarding storage operations.

In an illustrative embodiment, a management agent 130 in the first storage operation cell 50 may communicate with a management agent 130 in a second storage operation cell regarding the status of storage operations in the second storage operation cell. Another illustrative example may include a first management agent 130 in a first storage operation cell 50 that may communicate with a second management agent in a second storage operation cell to control the storage manager (and other components) of the second storage operation cell via the first management agent 130 contained in the storage manager 100 of the first storage operation cell 50.

Another illustrative example may include a management agent 130 in the first storage operation cell 50 that may communicate directly with and control the components in the second storage management cell, bypassing storage manager 100 in the second storage management cell. In an alternative embodiment, the storage operation cells 50 can also be organized hierarchically such that hierarchically superior cells control or pass information to hierarchically subordinate cells or vice versa.

Storage manager 100 may also maintain, in one embodiment, an index cache, a database, or other data structure 111. The data stored in database 111 may be used to indicate logical associations between components of the system, user preferences, management tasks, SRM data, HSM data or other useful metadata. As further described herein, some of this information may be stored in a media agent database 110 or other local data store. For example, the storage manager 100 may use data from database 111 to track logical associations between media agents 105 and storage devices 115.

Storage manager 100 also may include, in one embodiment, a metadata manager 133 or other program logic or code for identifying, coordinating and capturing metadata from different applications and/or software modules operating within a storage management system. Such metadata is typically descriptive of data running on clients 85 and may include data protection information such as last backup time, backup location, associated storage and/or schedule policies and other useful characteristics etc. Furthermore, in some embodiments, such metadata may include information describing or characterizing the data in general including application information, data size, content, format etc. Application data may be identified, located and accessed through the use of the metadata corresponding to the application data. One way this may be accomplished is through the use of filter drivers or other program logic or code as further described in U.S. patent application titled "Systems and Methods for Classifying and Transferring Information in a Storage Network, application Ser. No. 60/752,203 filed Dec. 19, 2005.

One embodiment of the storage operating system may include a single storage operation cell 50. Alternatively, the storage operating system may include multiple storage operation cells or domains that are in communication with one another and may be distributed across different network elements (e.g., servers, networks, storage media, etc.). A metadata manager 133 may monitor the creation and storage of metadata associated with various different modules within the storage operation cell 50. Metadata manager 133 may also facilitate the capture and storage of metadata generated at different times and across different software and/or hardware components of a storage domain. In one embodiment, metadata stored in the database 110 of a media agent 105 may be monitored by the metadata manager 133. Metadata manager 133 may direct job agent 120 to retrieve this metadata from a database 110. Once received, metadata manager 133 may coordinate storing the metadata at a storage manager database 111 (or any other local or remote storage device).

Metadata manager 133 may also provide metadata for display via the interface module 120. Such processing includes, among other things, categorizing the metadata and displaying the categorized metadata according to user preference. The metadata manager 133 also (alone or in conjunction with a management agent 130), may send retrieved metadata to a second storage operation cell, if implemented. Similarly, management agent 130 may coordinate receiving metadata from other storage operation cells 50, and storing the metadata at one or more designated storage devices such as, for example, database 110. For example, metadata manager 133 may coordinate sending metadata to storage device 115 via one of media agents 105.

In some embodiments, metadata generally contains data associated with storage policies and information related to system recovery. For example, the metadata may include information such as, but not limited to, the source storage device location of the data (i.e., production data), the target storage device to which the data was backed-up, the path taken by the data through the storage system network between the source and target storage devices, data format information, time of data file creation, data file size, data file format, data encryption information, and other information that may be related to the process of archiving, migrating, and recovering data across one more storage operation cells.

As illustrated in FIG. 1A, a media agent 105 may be implemented as a software module that conveys data, as directed by the storage manager 100, between a client computer 85 and one or more storage devices 115 such as a tape library, a magnetic media storage device, an optical media storage device, or any other suitable storage device. In one embodiment, media agents 105 may be linked with and control a storage device 115 associated with a particular media agent. A media agent 105 may be considered to be associated with a particular storage device 115 if that media agent 105 is capable of routing and storing data to the particular storage device 115.

Media agent 105 may also include a metadata agent 107 that manages the metadata that may be stored and created based on application data that may be copied or backed up to storage device 115 (or any other storage device via media agent 105).

In some embodiments, some or all of the metadata may be stored at an index cache or database 110, which is associated with a media agent 105. The metadata may also be stored at any other data structure or storage device (not shown) managed by the media agent 105. Metadata associated with the media agent 105 may provide information regarding the data that is stored in the storage devices 115. For example, the metadata may provide, among other things, information regarding the content type, data file size, time of storage, and network location from which the data was sent, routing information etc., and other types of metadata as further described herein.

In operation, a media agent 105 associated with a particular storage device 115 may instruct the storage device to use a robotic arm or other retrieval means to load or eject a certain storage media, and to subsequently archive, migrate, or restore data to or from that media. Media agents 105 may communicate with a storage device 115 via a suitable communications path such as a SCSI or fiber channel communications link. In some embodiments, storage device 115 may be linked to a data agent 105 via a Storage Area Network ("SAN").

Each media agent 105 may maintain an index cache, a database, or other data structure 110 which may store index data and/or other metadata generated during backup, migration, and restore and other storage operations as described herein. For example, performing storage operations on Microsoft Exchange® data may generate index data. Such index data provides a media agent 105 or other external device with a fast and efficient mechanism for locating the data copied, stored or otherwise backed up. In some embodiments, a storage manager database 111 may store data associating a client 85 with a particular media agent 105 or storage device 115, as specified in a storage policy. The media agent database 110 may indicate where specifically the client 85 data is stored in storage device 115, what specific files were stored, and other information associated with storage of the client 85 data.

In some embodiments, such index data may be stored along with the data backed up in a storage device 115, with an additional copy of the index data written to index cache 110. The data in the index cache 110 is thus readily available for use in storage operations and other activities without having to be first retrieved from storage device 115. In performing storage operations, metadata agent 107 may access metadata from a database 110 in order to perform certain operations associated with storage device 115. The metadata may include, for example, information regarding the robot arm or other retrieval means used to load or eject certain storage media.

According to one embodiment, metadata that may be generated (e.g., at data agent 95 or media agent 105) and stored at the media agent 105 may be monitored and accessed by metadata agent 107 according to various user definable data management criteria. For example, metadata agent 107 may notify the metadata manager 133 in storage manager 100 of additionally created metadata based on a periodic time schedule. Based on this schedule, the storage manager may direct the transfer of the created metadata, for example, to a central storage device (e.g., centralized database) where all created metadata in the storage operation cell may be copied, for example, to database 111. According to another example, metadata agent 107 may also notify metadata manager 133 in the storage manager 100 of additionally created metadata based on a certain volume (e.g., amount of data processed, aggregate file size, etc.) of generated metadata.

In some embodiments, certain components may reside and execute on the same computer. For example, a client computer 85 including a data agent 95, a media agent 105, or a storage manager 100 coordinates and directs local archiving, migration, and retrieval application functions as further described in U.S. Pat. No. 7,035,880. This client computer 85 can function independently or together with other similar client computers 85. An example of this embodiment is illustrated in FIG. 1B.

Figure 1B:
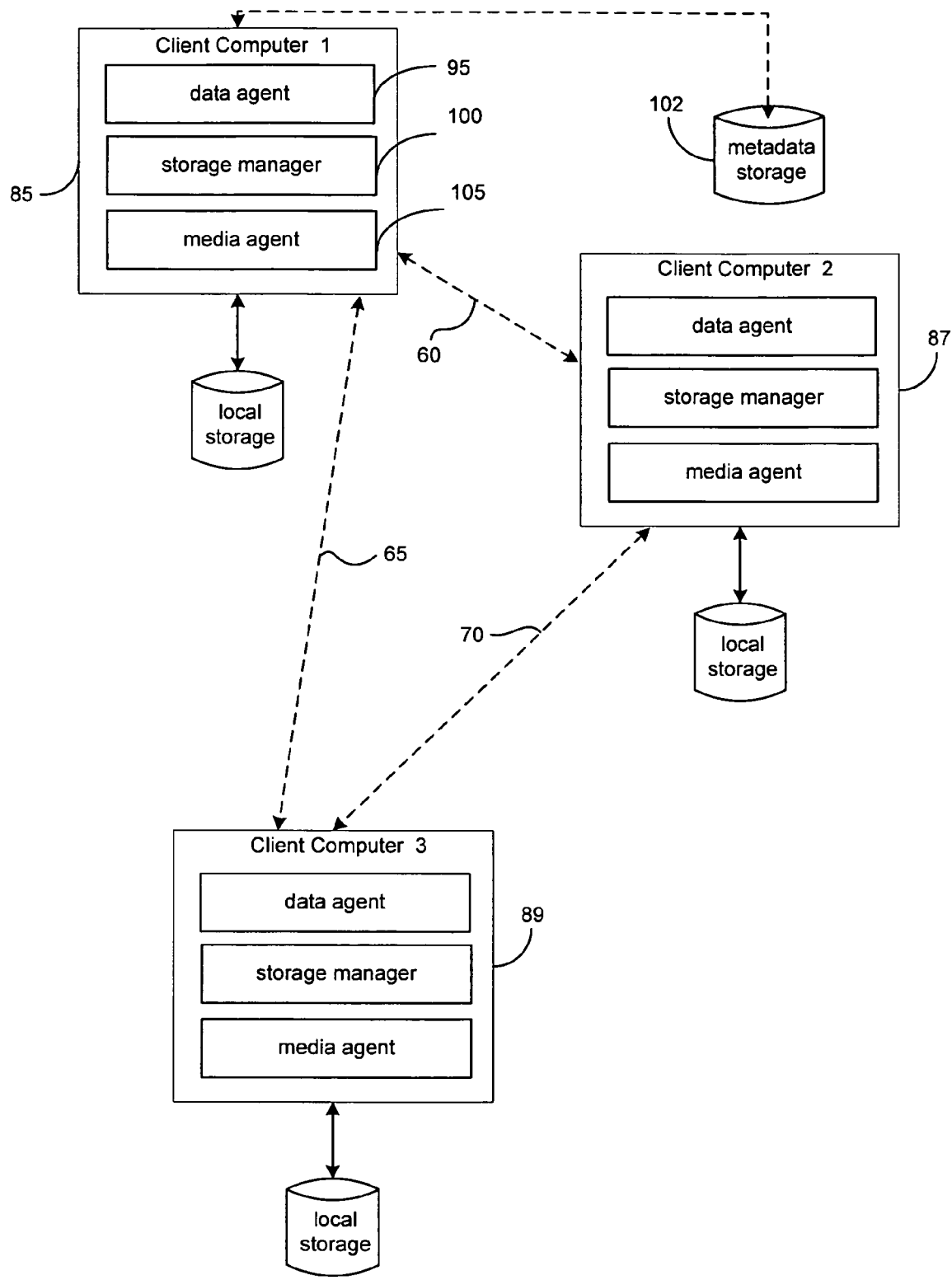
FIG. 1B illustrates the exchange of metadata between client computers of a storage operation system according to an embodiment of the invention.

In the embodiment of FIG. 1B, metadata generated by each client computer 85, 87, 89 may be exchanged over communications links 60, 65, and 70. For example, metadata generated at client computer 85 may be copied to a storage device or database such as the metadata storage device 102. Additionally, metadata generated at the client computer 87 may be sent to the client computer 85, and copied to the metadata storage device 102.

Similarly, metadata generated by client computer 89 may also be sent to client computer 85, and also be backed up to metadata storage device 102. In this embodiment, metadata may be sent to a central storage device (i.e., metadata storage device 102) that may collect the metadata from multiple client computers 85, 97, 89 each operating one or more storage operation cells. This may be achieved by one or more storage managers (e.g., storage manager 100) associated with either of the client computers coordinating the collection of metadata from other client computers and backing up the collected metadata to a central storage device or database such as storage device 102.

Figure 1C:
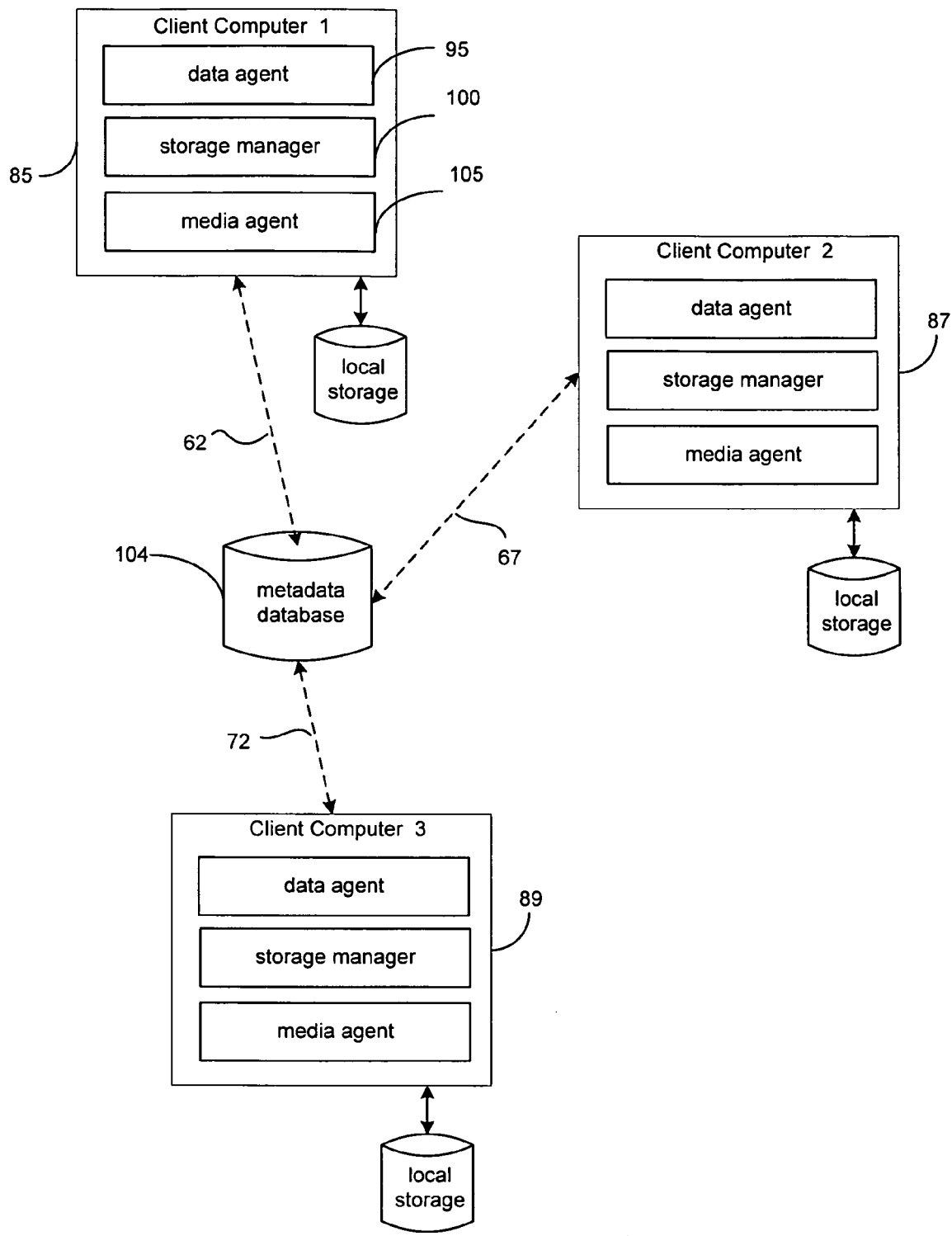
FIG. 1C illustrates the exchange of metadata between client computers of a storage operation system according to another embodiment of the invention.

Alternatively, in another as embodiment illustrated in FIG. 1C, metadata generated by each client computer 85, 87, 89 or storage manager or other host may be exchanged over communications links 62, 67, and 72 directly to a centralized repository or database 104 for storing or backing up metadata. In this embodiment, metadata generated at the client computers 85, 87 and 89 may be sent directly to the storage device or database 104 via the communication links 62, 67 and 72 respectively.

Figure 2:
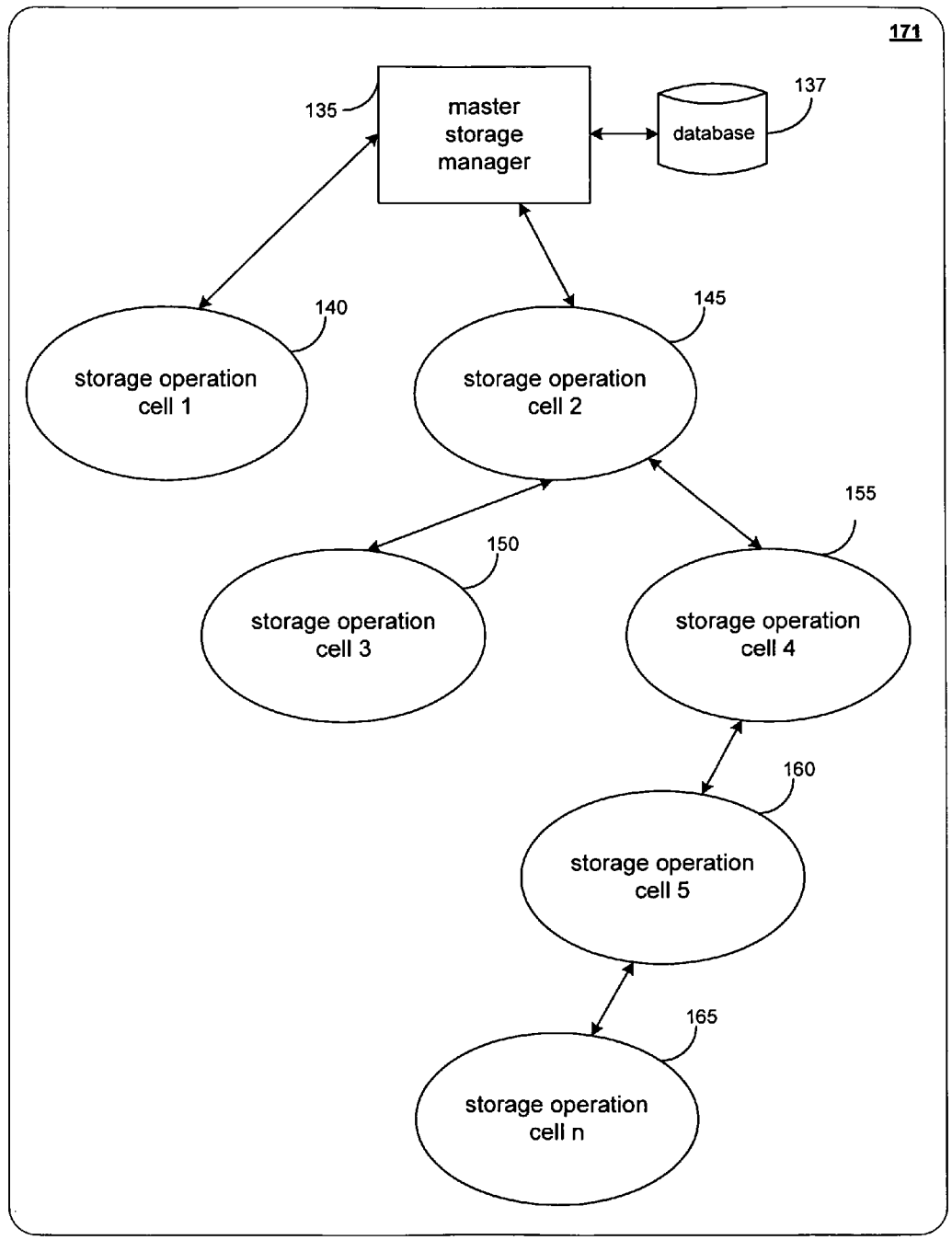
FIG. 2 is a block diagram of a hierarchically organized group of storage operation cells in a system to perform storage operations on electronic data and metadata in a computer network according to an embodiment of the invention.

FIG. 2 presents a generalized block diagram of a hierarchically organized group of storage operation cells in a system to perform storage operations on electronic data in a computer network in accordance with an embodiment of the present invention. Although the storage operation cells generally depicted in FIG. 2 have different reference numbers than the cell 50 shown in FIG. 1, one skilled in the art should recognize that these cells may be configured the same as or similarly to storage cell 50 depicted in FIG. 1, without deviating from the scope of the present invention.

As shown in the embodiment of FIG. 2, the system may include a master storage manager component 135 and various other storage operations cells. The system includes a first storage operation cell 140, a second storage operation cell 145, a third storage operation cell 150, a fourth storage operation cell 155, a fifth storage operation cell 160, and an nth storage operation cell 165. It should will be understood by one skilled in the art this illustration is only exemplary and that fewer or more storage operation cells may be present or differently interconnected if desired.

Storage operation cells, such as the ones shown in the embodiment of FIG. 2 may be linked and hierarchically organized. A master storage manager 135 may be associated with, communicate with, and direct storage operations for a first storage operation cell 140, a second storage operation cell 145, a third storage operation cell 150, a fourth storage operation cell 155, a fifth storage operation cell 160, and an nth storage operation cell 165. In some embodiments, the master storage manager 135 may not be part of any particular storage operation cell. In other embodiments (not shown), master storage manager 135 may itself be part of a certain storage operation cell.

In operation, the master storage manager 135 may communicate with a management agent of the storage manager of the first storage operation cell 140 (or directly with the other components of first cell 140) with respect to storage operations performed in the first storage operation cell 140. For example, in some embodiments, the master storage manager 135 may instruct the first storage operation cell 140 with certain commands regarding a desired storage operation, such as how and when to perform particular storage operations including the type of operation and the data on which to perform the operation.

In alternative embodiments, the master storage manager 135 may track the status of its associated storage operation cells. The master storage manager 135 may periodically poll and track the status of jobs, system components, system resources, metadata information and other items, by communicating with the manager agents (or other components) in the respective storage operation cells. Moreover, the master storage manager 135 may track the status of its associated storage operation cells by receiving periodic status updates from the manager agents (or other components) in the respective cells regarding jobs, system components, system resources, and other items.

Master storage manager 135 may monitor an analyze network resources, for example, to map network pathways and topologies to, among other things, physically monitor storage operations, to determine alternate routes for storing data as further described herein. Other methods of monitoring the storage operations cells may include periodic polling by a monitor agent, pre-configured threshold responses, etc. Pre-configured threshold responses may be triggered if a storage operation cell exceeds a threshold value defined by a system administrator (e.g., file size, storage availability, traffic congestion, data transfer rate, etc.).

While the embodiments described herein describe a variety of network characteristics which a storage manager may monitor and control, one skilled in the art will recognize that such characteristics are illustrative and any suitable operational characteristic associated with a electronic storage network may be monitored and used a basis for establishing an operation threshold without deviating from the scope of the present invention.

Master storage manager 135 may also monitor and access metadata that may be created by various storage operation cells that are in communication with storage manager 135. For example, metadata created and/or stored at storage operation cells 140, 145, 150, 155, 160, and 165 may be monitored and accessed by the master storage manager 135. Master storage manager 135 may forward or send the accessed metadata to one or more of the storage devices or databases 137 to generate a centralized repository of metadata across the entire storage operation system 171. Thus, database 137 may include information representing a unified view of the various metadata information collected across the different storage operation cells operating in a storage management system.

Such a unified view of the metadata collected across the entire storage network may provide an advantageous benefits in the management of the network. For example, the unified view may present the system, or system administrator with a broad view of the utilized resources of the network. Presenting such data to one centralized manager may allow for a more comprehensive management and administration of network resources. The storage manager, either via a preconfigured policy or via a manual operation from a system administrator, may reallocate resources improve network efficiency. Data paths from storage operation cells may be re-routed to avoid areas of the network which may suffer from traffic congestion by taking advantage of underutilized data paths or operation cells.

Additionally, should a storage operation cell approach, arrive at or exceed a cache size maximum, storage device capacity, or fail outright, several routes of redundancy may be triggered to ensure the data arrives at the location for which it was intended. A unified view may provide the manager with a collective status of the entire network allowing the system of adapt and reallocate the many resources of the network for faster and more efficient utilization of those resources.

In some embodiments, master storage manager 135 may store status information and other information regarding its associated storage operation cells and other system information in an index cache, database or other data structure. A presentation interface included in certain embodiments of the master storage manager 135 may access this information and present it to users and system processes with information regarding the status of storage operations, storage operation cells, system components, and other information of the system. The presentation interface may include a graphical user interface ("GUI"), a text/command-line interface, or other various user interfaces. The presentation interface may display the overall status of the network to a display monitored by the system administrator. The system administrator may oversee the dynamic reallocation and automatic reconfiguration of the network as events are triggered, or may take an active role in manually reassigning roles and redistributing the load across the network.

In other embodiments master storage manager 135 may alert a user such as a system administrator when a particular resource is unavailable or congested. For example, a particular storage device might be full or require additional media. Master storage manager 135 may use information from an HSM storage operation cell and an SRM storage operation cell to present indicia or otherwise alert a user. Additionally, master storage manager 135 may otherwise identify aspects of storage associated with the storage management system and hierarchy of storage operation cells.

While the embodiments described herein describe certain monitor and control configurations, one skilled in the art will recognize that these are illustrative examples and information may be presented, transmitted and monitored through a variety of methods, (i.e. personal digital assistant ("PDA"), workstation monitor, periodic status emails, etc.) without deviating from the scope of the invention.

Alternatively, a storage manager in a particular storage operation cell may be unavailable due to hardware failure, software problems, or other reasons. In some embodiments, master storage manager 135 (or another storage manager within the hierarchy of storage operation cells) may utilize globally collected metadata from storage device 137 in order to restore storage operation cells. For example, master storage manager 135 may alert the user that a storage device in a particular storage operation cell is at capacity, congested, or otherwise unavailable. The master storage manager may then suggest, based on job and data storage information contained in its database, an alternate storage device. In one embodiment, the master storage manager may dynamically respond to such conditions, by automatically assigning a new storage device or alternate storage path across the network based on a "best alternate available" basis. Alternatively, a user, or system administrator may be required to manually reconfigure, or choose from among a group of reconfiguration options presented by the system, to alleviate the condition triggered the fault or alert.

The master storage manager may collect metadata at a central location and/or maintain a representation of the metadata associated with a particular application regardless of whether or not, the application is distributed. A unified view across certain domains or storage operation cells in a storage system can present a global view of system resources (e.g., distribution of particular data stored on the storage devices) and may be used for various purposes such as data recovery, reconstruction, forecasting and other predictive, corrective or analytical purpose.

The metadata may be analyzed by the master storage manager, which can use the information for load balancing, failover and other resource allocation tasks. The master storage manager may suggest to the system administrator one or more alternate data paths to a particular storage device, dividing data to be stored among various available storage devices based on data type as a load balancing measure, or otherwise optimizing data storage or retrieval times based on the processing of time-related metadata. In some embodiments, such options or corrective actions may be performed automatically without an user acknowledgement.

Figure 3:
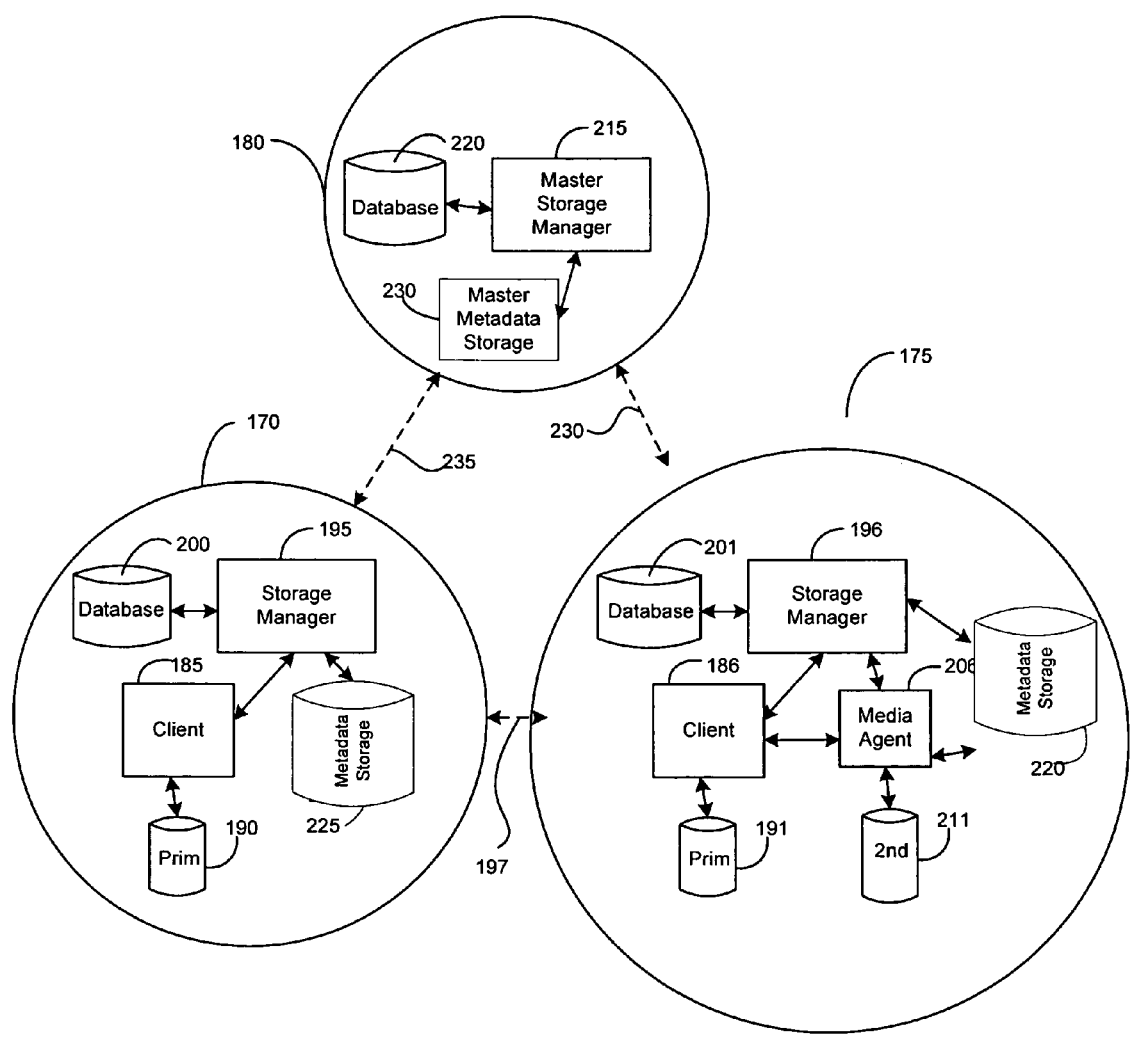
FIG. 3 is a block diagram of a hierarchically organized group of storage operation cells according to an embodiment of the invention.

FIG. 3 illustrates a block diagram of a hierarchically organized group of storage operation cells in a system to perform storage operations on electronic data in a computer network in accordance with the principles of the present invention. As shown, the system may include a first storage operation cell 170, a second storage operation cell 175, a third storage operation cell 180. The storage operation cells 170, 175, 180 may be connected by a series of communication links 235, 230, 197. Certain storage operation cells 170, 175, may include, a client 185, 186 in communication with a primary volume 190, 191 for storing data, a storage manager component 195, 196 in communication with a storage manager database 200 and a metadata storage volume 225. The second storage operation cell 175 may include a media agent 206 in communication with a secondary storage volume 211. The third storage operation cell 180 may include a metadata storage volume 220, and a master storage manager component 215 in communication with a master storage manager database 220 and master metadata storage database 230.

The first storage operation cell 170, in this embodiment may be configured to perform a particular type storage operation, such as SRM storage operations. For example, first storage operation cell 170 may monitor and perform SRM-related calculations and operations associated with primary copy data. Thus, first storage operation cell 170 may include a client component 185 in communication with a primary volume 190 for storing data. Client 185 may be directed to using Microsoft Exchange® data, SQL data, Oracle data, or any other types of production data used in business or other applications and stored in the primary volume 190. Client 185 may also generate metadata based on the production data (e.g., from volumes 190 and 191) Storage manager component 195 may contain SRM modules or other logic directed to monitoring or otherwise interacting with attributes, characteristics, metrics, and other information associated with the data stored in primary volume 190. Storage manager 195 may track and store this and other information in storage manager database 200 which may include index information. For example, in some embodiments, storage manager component 195 may track or monitor the amount of available space and other similar characteristics of data associated with the primary volume 190. In some embodiments, storage manager component 195 may also issue alerts or take other actions when the information associated with primary volume 190 satisfies certain criteria.

Actions triggered by such an alert may include an audible or visual alert to a monitor and control station or an email or other textual notification sent to an administrator. The alerts may contain details of the event or status and suggest a variety of options to correct or alleviate the network conditions for which the alert was generated. Alternatively, the system may be configured such that the storage manager dynamically corrects or alleviates the alert condition automatically by reallocating network resources based on the utilization characteristics of other resources in the network. In some embodiments, the network may also include other storage managers, media agents and databases. Storage manager 195 may also track and store the generated metadata associated with the stored client data in metadata storage volume 225.

The second storage operation cell 175 may be directed to another type storage operation, such as HSM storage operations. For example, second storage operation cell 175 may perform backups, migrations, snapshots, or other types of HSM-related operations known in the art. In some embodiments, data may be migrated from faster and more expensive storage such as magnetic storage (i.e., primary storage) to less expensive storage such as tape storage (i.e., secondary storage).

This migration may allow the network to continue to operate at high levels of efficiency by maintaining available resources for readily accessible data. Certain types of storage may be better suited to certain types of data. Faster storage devices may be used in situations for which access to the data is time critical. Slower devices may be utilized to store other data for which access time is not as critical. The migration also may allow for efficient organization of different classes of data. A system administrator, or otherwise qualified user of the network, may determine that certain categories of data, or metadata, are more important than others and may need to be immediately accessible by a system. This data may be the most recent data, the most often accessed data, or data deemed "mission critical," or any other suitable data characteristic.

In this illustrative embodiment, second storage operation cell 175 may include a client component 186 in communication with the primary volume 191. In some embodiments, client component 186 and primary volume 191 may be the same physical devices as the client component 185 and primary volume 190 in first storage operation cell 170 (e.g., logically but mot physically separated). Similarly, in some embodiments, the storage manager component 196 and database 201 (which may include index information) in second storage operation cell 175 may be the same physical devices as the storage manager component 195 and index database 200 in first storage operation cell 170. The storage manager component 196, however, typically, may also contain HSM modules or other logic associated with second storage operation cell 175 directed to performing HSM storage operations on the data of the primary volume 191. In storage operation cell 175, storage manager 196 may also track and store the generated metadata associated with the data of client 186. Storage manager 196 may store the generated metadata to the metadata storage volume 220

Second storage operation cell 175, in this embodiment, may also include a media agent 206 and a secondary storage volume 211 configured to perform HSM-related operations on primary copy data. For example, storage manager 196 may migrate primary copy data from primary volume 191 to secondary volume 211 using media agent 206. Metadata associated with the migrated data may be stored by media agent 205 at metadata storage volume 220. The media agent 205 may store this metadata either directly or through the intermediary of storage manager 196. Storage manager 196 may also track and store information associated with primary copy migration and other similar HSM-related operations in storage manager database 201. In some embodiments, storage manager component 196 may direct HSM storage operations on primary copy data according to a storage policy associated with the primary copy 191 and stored in the index 201. Storage manager 196 may also track where primary copy information is stored, for example in secondary storage 211.

The third storage operation cell 180, in this embodiment, may include a master storage manager 215, a database 220 and a master metadata storage device 230. In some embodiments (not shown), additional storage operation cells may be located hierarchically in between the third storage operation cell 180 and first and second storage operation cells 170, 175. In some embodiments, additional storage operation cells hierarchically superior to operation cell 180 may also be present in the hierarchy of storage operation cells.

In some embodiments, first and second storage operation cells 170, 175 may be connected by communications link 197, which may be any suitable wired or wireless communications link such as a WiFi link, a fiber channel or SCSI connection that allows storage operation cells 170, 175 to communicate directly with one another (i.e., without necessarily directly or indirectly involving third storage cell 180). This may be accomplished, for example, by storage manager 195 of the first storage operation cell 175 communicating with storage manager 196 of the second storage operation cell via link 197. This may allow first and second storage operation cells 170, 175 to share information to one another such as, without limitation, network status, operational metrics or availability on primary or secondary storage.

Link 197 may allow the first and second storage operation cells also to share information regarding any triggered events based on such information. Examples of these types of events include, but are not limited too, network congestion at any of the storage operation cells, faults in the network, limited storage capacity, slow data transfer, etc. This arrangement may allow for the direct transfer of stored data to from and from the cells (via link 197) without the need to communicate with or pass data through master storage manager 215. Direct link 197 may allow for the efficient communication of the storage operation cells without having to pass through an intermediary (the third storage operation cell in this embodiment) and causes the storage operation cells to react or adapt to network conditions faster.

Third storage operation cell 180 may also be directed to coordinating and managing the collection of generated metadata from all of the storage operation cells in the hierarchy, such as the first and second storage operation cells 170, 175 of this embodiment. The master storage manager 215 of the third storage operation cell 180 may communicate with the storage managers 195, 196 of the first and second storage operation cells over the communication links 225, 230. The master storage manager 215 may periodically poll the storage managers 195, 196 in order to determine whether newly created metadata has been generated. This polling may occur in accordance with user defined schedules or policies associated with the storage operation cell. For example, a storage operation cell may generate metadata more regularly than others, and therefore, may be polled more regularly by master storage manager 215.

In operation, master storage manager 215 may poll storage manager 195 for metadata. The storage manager 195 may then check to determine whether updated metadata has been stored in metadata storage volume 225. If updated metadata exists, it may be sent to the master storage manager 215 for storage at the master metadata storage 230. Similarly, master storage manager 215 may poll storage manager 196 of second storage operation cell 175 for metadata. Storage manager 196 may also check to determine whether updated metadata has been stored in the metadata storage volume 220. If updated metadata exists, it may also be sent to master storage manager 215 for storage at master metadata storage 230.

According to another embodiment, in operation, master storage manager 215 may receive metadata updates from storage managers 195, 196 of the first and second storage operation cells 170, 175 without the need for polling. In this case, the storage managers within the storage operation cells notify the master storage manager of created or updated metadata. For example, under the direction of storage manager 195 of the first storage operation cell, metadata updates may be accessed from metadata storage 225, whereby the accessed metadata may be sent over the link 225 to the third storage operation cell 180. At third storage operation cell 180, master storage manager 215 may receive and store the updated metadata to master metadata storage 230. Similarly, under the direction of the storage manager 196 of the second storage operation cell, metadata updates may be accessed from the metadata storage device 220 and sent over link 230 to third storage operation cell 180. At third storage operation cell 180, master storage manager 215 may receive and store the updated metadata to master metadata storage 230. According to other embodiments, a combination of both embodiments discussed above may be utilized according network related or user defined information.

The hierarchy of the illustrative embodiments may provide advantages in the maintenance and operation of a storage network. The several communication links may provide redundancy of many levels (depending on the number of storage operation cells implemented) and allow for a storage manager to direct and adapt the storage operations. In certain embodiments the storage manager may be dynamically configured to automatically adjust the communication paths and flow of data traffic through the communication links and storage operation cells based on a variety of circumstances, such as traffic congestion, communication link failure, limited storage space, etc. In alternative embodiments, the storage manager may present the network status, or alerts, to a system administrator, who in turn may manually instruct the storage manager to reallocate resources to alleviate any issues in the storage network.

Figure 4A:
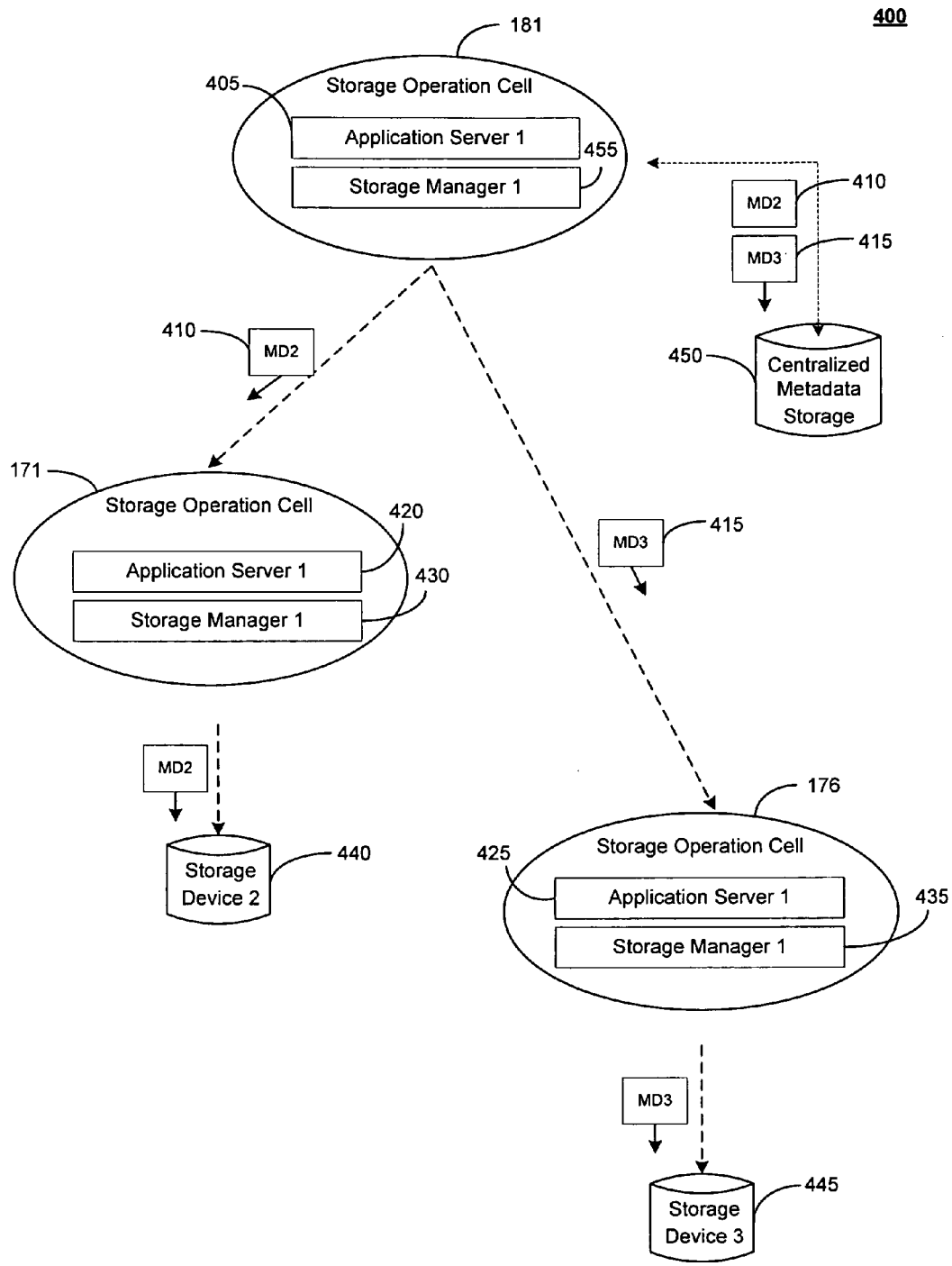
FIGS. 4A and 4B present a generalized block diagrams illustrating the transfer of metadata according to an embodiment of the invention.
Figure 4B:
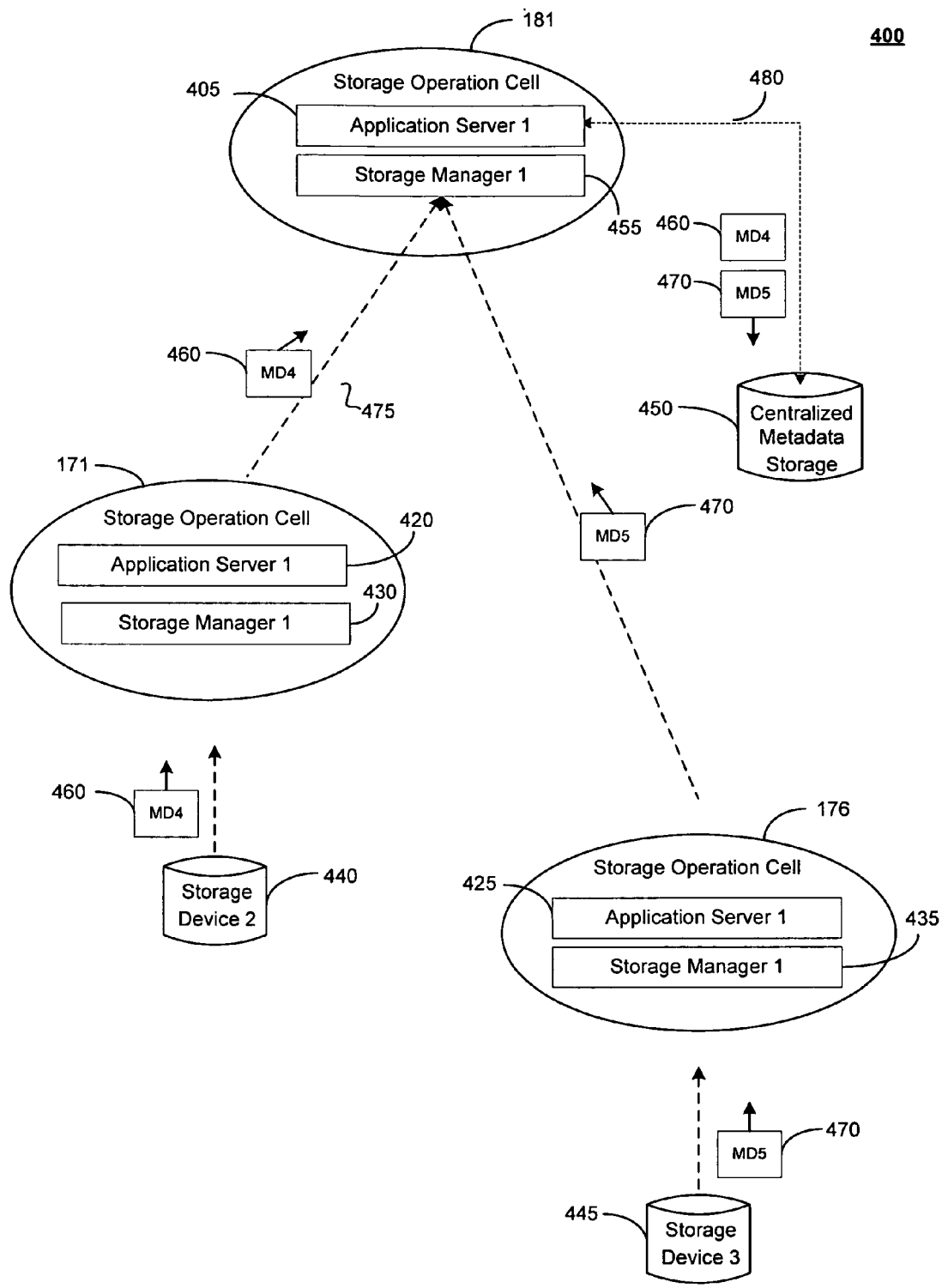

FIGS. 4A and 4B present a generalized block diagram 400 illustrating metadata flow between multiple server devices in a storage operation system according to an embodiment of the invention. The illustrative system may include a first storage operation cell 171, having an application server 420 and a storage manager 430. The first storage operation cell 171 may include a communication link to a storage device 440. A second storage operation cell 176 may be included also having an application server 425 and a storage manager 435 as well as a communication link to a storage device 445. A third storage operation cell 181 includes an application server 405 and a storage manager 455. The third storage operation cell 181, of this embodiment, may include a communications link to a centralized metadata storage device 450.

As illustrated in FIG. 4A, sets of metadata 410, 415 generated at the application server 405 of the third storage operation cell may be sent with their corresponding application data to the application servers of the first and second storage operation cells 420, 425, for storage. Also, the generated metadata 410, 415 may be stored at the centralized metadata storage device 450 under the direction of storage manager 455 of the third storage operation cell. At the first storage operation cell's application server 420, under the direction of the storage manager 430, metadata 410 may be stored at storage device 440, while at application server 425 of the second storage operation cell, under the direction of storage manager 435, metadata 415 may be stored at storage device 445.

As illustrated in FIG. 4B, additional metadata 460, 470 may be received and stored via the application servers 420, 425 of the first and second storage operation cells 171, 176. For example, in some embodiments, metadata 460 sent from, and/or generated by the first storage operation cell may have been received from other storage cells and stored in storage device 440 under the direction of storage manager 430. Alternatively, metadata 460 may have been generated within the application server 420 prior to being stored at storage device 440. Similarly, metadata 470 sent from the second storage operation cell 176 may have been received from other storage cells and stored in the storage device 445 under the direction of storage manager 435. Alternatively, metadata 470 may also have been generated within application server 425 prior to being stored at storage device 470.

As mentioned above, in one embodiment, metadata 460 may have been generated within the application server 420 prior to being stored at storage device 440. Therefore, various blocks or fragments of metadata (e.g., metadata 460 and 470) may be generated and/or distributed across different storage operation cells operating over different communication network elements (e.g., server 420 and 435). According to an embodiment of the invention, metadata 460 may be migrated from storage device 440 through the first storage operation cell 171 to the centralized metadata storage device 450 via communication links 475, 480. Also, under the direction of the storage manager 435 of the second storage operation cell and the storage manager of third storage operation cell 455, metadata 470 may be migrated from the storage device 445 to the centralized metadata storage device 450 via communication links 477, 480. As described, metadata from different operating cells and network elements may be collected and centralized in metadata storage 450.

This embodiment of the present invention may include, among other things, up-to-date readily accessible metadata that may be used to determine information corresponding to electronic data that may be stored or archived on different storage resources in a storage operation system. In addition to being used for storage system recovery, the metadata may be analyzed and processed in order to determine various performance metrics associated with the different storage operation cells of the storage operation system. As discussed in detail above, these performance metrics may include data transfer rates, traffic congestion locations, storage space, file size, network resource allocation, etc. One skilled in the art will recognize that these metrics are illustrative, and that any m suitable metric of a computer network may be monitored and calculated using the embodiments described herein without departing from the scope of the invention.

Figure 5:
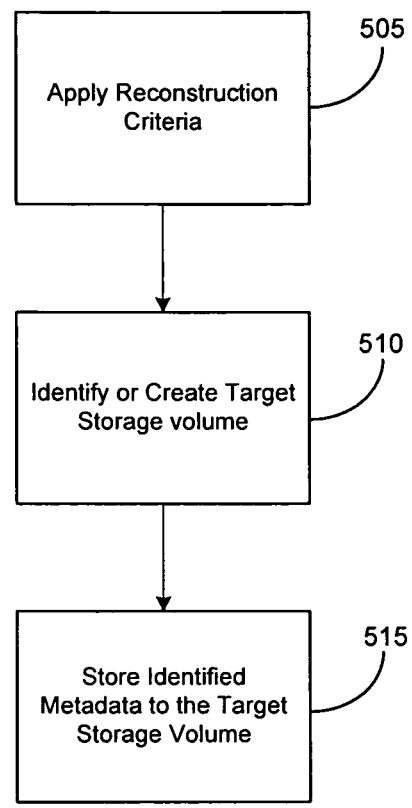
FIG. 5 is a flow diagram generally illustrating some of the steps involved in storing metadata to a central storage device according to an embodiment of the invention.

FIG. 5 is a flow diagram 500 generally illustrating some of the steps involved in storing metadata to a central storage device within a storage operation system according to an embodiment of the invention. At step 505, one or more reconstruction criteria may be used to collect metadata from different storage locations that may be managed by one or more storage operation cells. The reconstruction criteria may include, for example, each storage operation cell sending created metadata to a designated storage cell that handles storing metadata to a central storage device or database. Each operation cell may send this metadata to the central storage device based on a pre-defined policy. The policies may include, for example, the metadata reaching a threshold size, a user defined periodic update schedule, the type of data involved, based on the identity of a user creating the data, or immediately upon creation. The metadata may be transmitted by polling or requesting information from the operation cells based on an external device or module monitoring and facilitating the migration of the created metadata to the central storage device, or any other criteria.

At step 510, based on the reconstruction criteria, a target storage operation cell and storage device may be identified, selected or created for storing the metadata that is retrieved from different storage operation cells and storage devices. Once the target storage device is determined, metadata may be identified from across the storage operation cells and sent to the target storage device (step 515). In some embodiments, metadata may include information regarding the origin or creation point of the data to facilitate merger at the destination.

Figure 6:
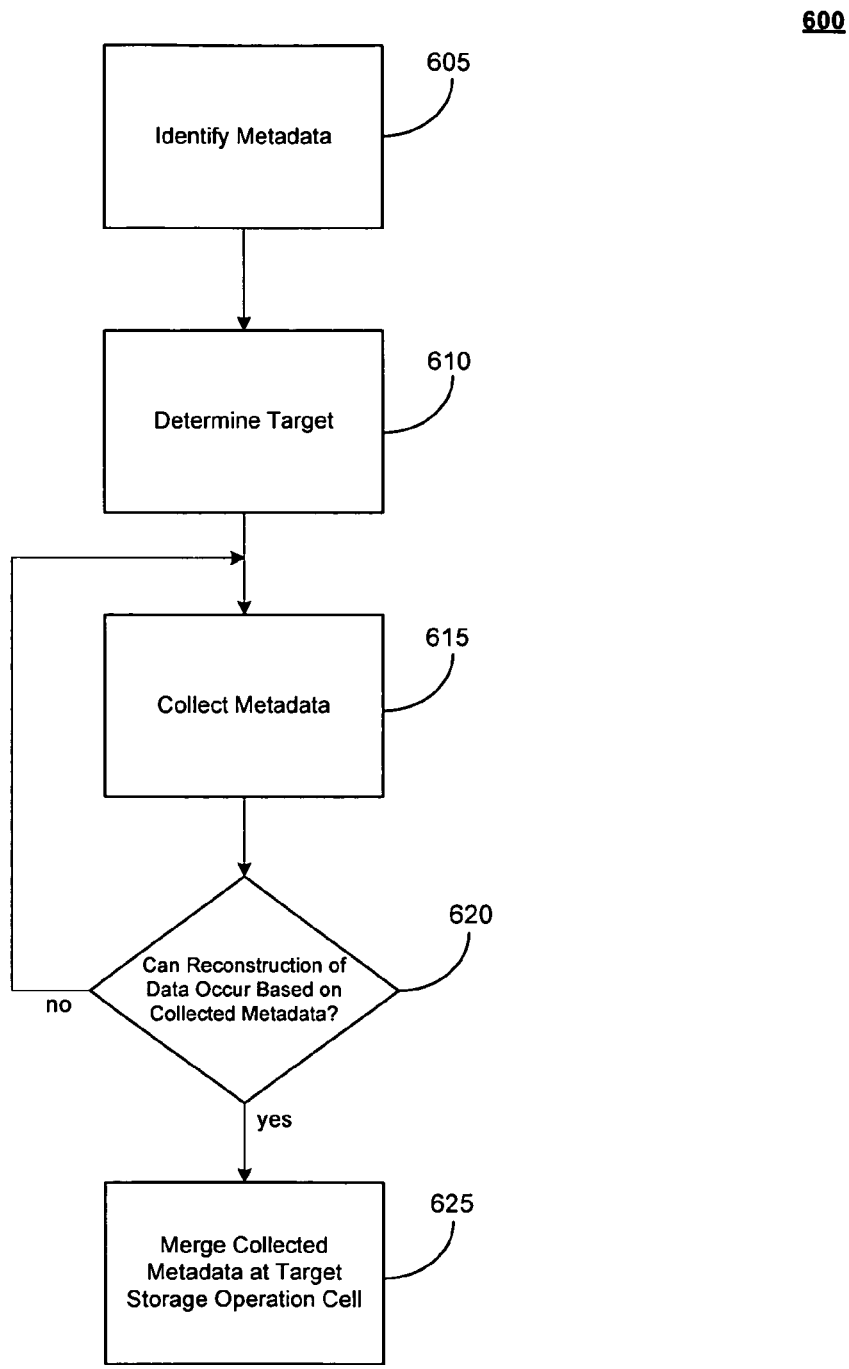
FIG. 6 is a flow diagram of a method of reconstructing metadata within a storage operation system according to an embodiment of the invention.

FIG. 6 is a flow diagram 600 generally illustrating some of the steps involved in recreating or collecting metadata within a storage operation system according to an embodiment of the invention. At step 605, metadata that may be periodically replicated, backed up, archived, or otherwise copied or stored at different times and/or on different storage operation cell locations may be identified by a storage manager module (e.g., metadata manager 133; FIG. 1A) within a designated storage operation cell. The designated storage operation cell may be a another cell or a master storage operation cell that monitors and manages SRM and HSM activities in other storage operation cells in a hierarchy of storage operation cells. In other embodiments, the storage operation cell may be selected based on geography (e.g., Chicago) or location (e.g., Head Office in New York) or other criteria such as capacity, availability, efficiency, user preference, convenience, etc.

Once the metadata has been identified (step 605), the target storage cell, volume or device to which the metadata is sent may be determined (step 610). This determination may be based upon any number of network utilization metrics, including but not limited to, storage media space, traffic congestion, data transfer rates, file size, concurrent storage operations, etc. Once identified metadata from different storage operation cells is collected (615), it may be determined whether certain metadata entries may be reconstructed (step 620). This may include determining whether sufficient metadata relating to one or more storage operations has been identified and whether this identified metadata is complete, uncorrupted and/or it represents the data (e.g., whether entries are missing and if so, is the missing information critical, such that not enough meaningful information can be obtained, even if available records combined).

If at step 620, it is determined that the metadata cannot be reconstructed (e.g., recreated from the constituent parts retrieved from across the system), metadata from the one or more storage operation cells may continue to be collected (step 615) until sufficient metadata is obtained to successfully complete the reconstruction process. Alternatively, an alert may be sent indicating that the metadata cannot be recreated based on the available information. Once reconstruction of the metadata occurs (step 620), the collected metadata may be merged by storing the metadata to the target storage device (step 625).

Merging metadata may be performed as is known in the art and/or may generally include some or all of the following. Comparing metadata at a first location with that at a second location as further described herein to determine if differences exist. Determining whether there any redundancies in metadata at the two (or more) locations. Polling or otherwise communicating with the location having metadata that is not present at the other location, and requesting that metadata be transmitted. Receiving and arranging the received metadata to reconstruct missing or corrupted metadata. Analyzing the reconstructed metadata to determine whether any metadata remains missing or is otherwise unusable. Searching for additional metadata in other locations if it is determined the reconstructed metadata section is incomplete.

Figure 7:
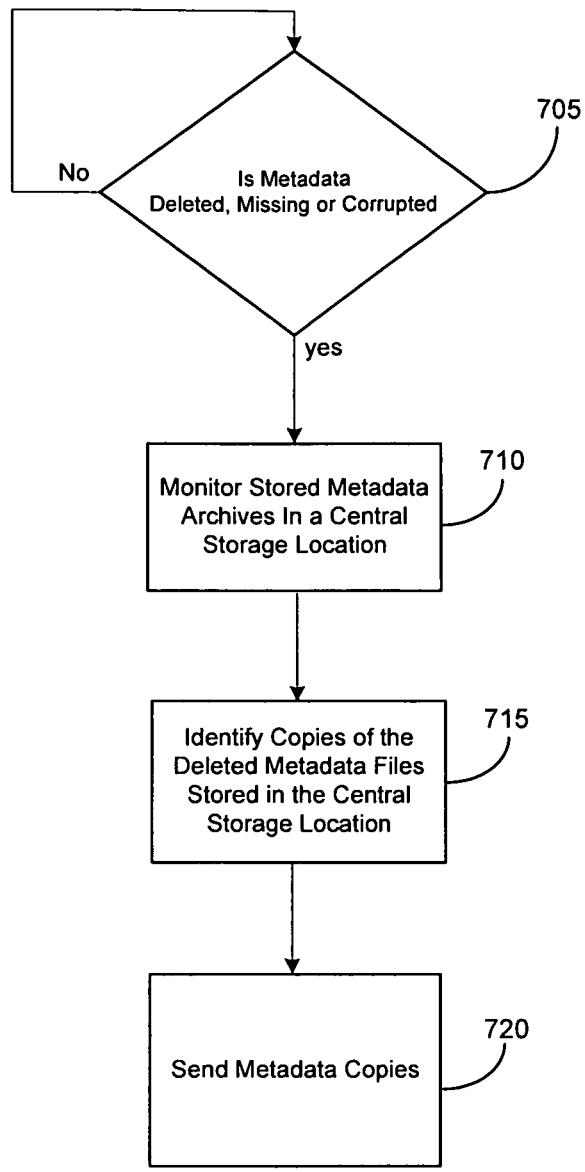
FIG. 7 is a flow diagram illustrating some of the steps involved in recovering deleted metadata within a storage operation system according to an embodiment of the invention.

FIG. 7 is a flow diagram 700 generally illustrating some of the steps involved in recovering deleted metadata within a storage operation system according to an embodiment of the invention. At step 705, it may be determined whether metadata has been inadvertently deleted at one or more storage operation cells. This may be accomplished, for example, by identifying source data, such as by an Update Sequence Number (USN), File reference number (FRN) or other identifier which has no corresponding metadata. For example, metadata may have been deleted from a media agent module or other component associated with a storage operation cell. Once it has been determined that metadata has been deleted or inadvertently removed from a storage operation cell module or element (e.g., media agent), stored metadata archives that are stored at a centralized storage location are monitored or quiesced (step 710). The centralized storage location may, for example, include one or more storage devices for storing the metadata for the entire storage operation system.

Based on monitoring the centralized storage location, at step 715 copies of the deleted metadata files may be located and accessed from the centralized storage location. For example, the metadata associated with the media agent with the deleted metadata may be identified and accessed from the centralized storage location. At step 720, the accessed metadata may then be sent to the location or locations from which the metadata was deleted or corrupted. The media agent with the lost metadata may receive the metadata copies from the centralized storage location. This metadata is then integrated into the media agent metabase to refresh the entries in the metabase that may have been deleted, corrupted or are otherwise missing. This may include, comparing metadata for correspondence, and then arranging and merging metadata depending on availability, ability to correlate metadata from different locations with one another etc., and using any suitable integration techniques. The process may be repeated until the media agent database is fully refreshed or additional metadata is unavailable. This allows the present invention to leverage and harvest information distributed across one more networks to reconstitute or otherwise recreate lost metadata.

Figure 8:
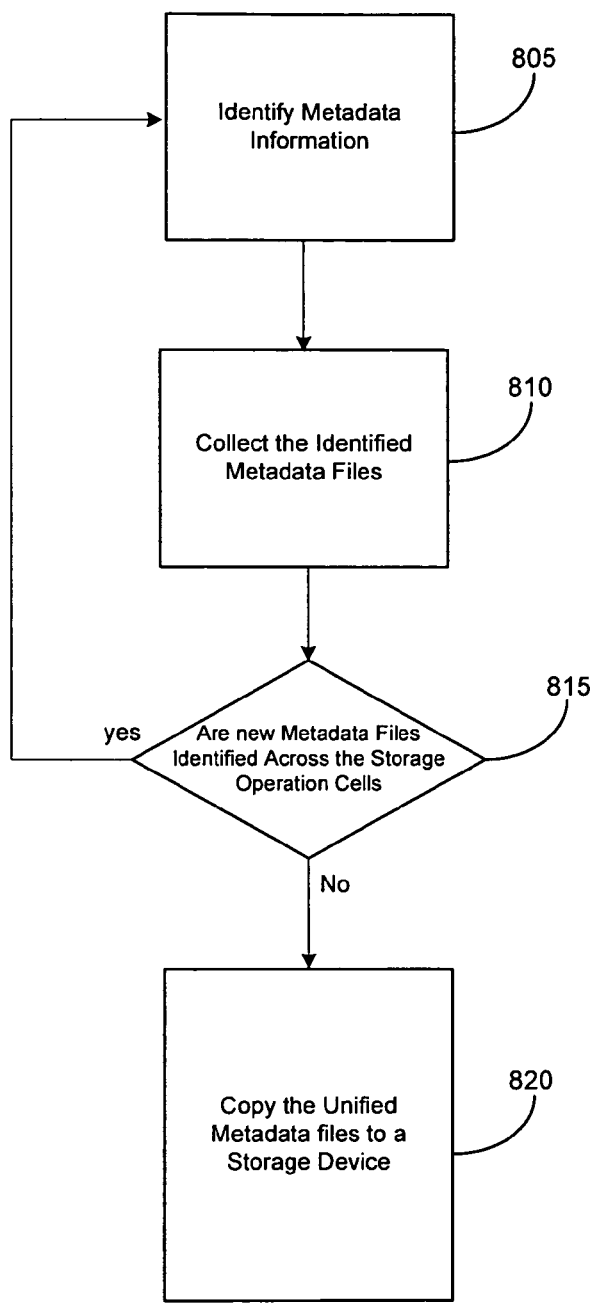
FIG. 8 is a flow diagram illustrating some of the steps involved in using metadata for storage system recovery operations according to an embodiment of the invention.

Turning to FIG. 8, a flow diagram 800 is presented illustrating some of the steps involved in using metadata for storage system recovery according to an embodiment of the invention. At step 805, metadata that may be created at different times and at different locations across a network of storage operation cells may be identified. The metadata may be monitored by modules within the storage managers of each storage operation cell. For example, a metadata manager 133 (FIG. 1A) may facilitate identification of created metadata in a storage manager. Also, modules external to the storage managers may provide metadata-monitoring capabilities. For example, metadata agent 107 (FIG. 1A) within media agent 105 (FIG. 1A) may also monitor and identify created metadata.

At step 810, identified metadata may be sent to a central storage location or database and may be arranged based on temporal information, which is useful for stepping through information correlated with a certain time or event. The metadata may then be integrated or otherwise unified with other metadata associated with the storage operation system. If it is determined that additional metadata may exist across the various storage operation cells (step 815), the additional metadata may continue to be identified and collected (steps 805 and 810) by the storage manager. At step 820, the integrated metadata is copied to a remote storage device so that the metadata may be accessed and utilized for disaster recovery operations in order to recover stored data that may have been lost.

The metadata may include identification information that is associated with each storage device, which, in some embodiments, may be unique. Thus, using this identification information, the metadata may facilitate the recovery of lost data by identifying the correct storage device to which the lost data was copied. Such an implementation may allow for the faster, more secure and more accurate recovery of lost or damaged data. In mission critical operations, it may be desired to provide a storage operation system in which backup or stored data may be immediately retrieved using the most efficient and time effective components.

Figure 9:
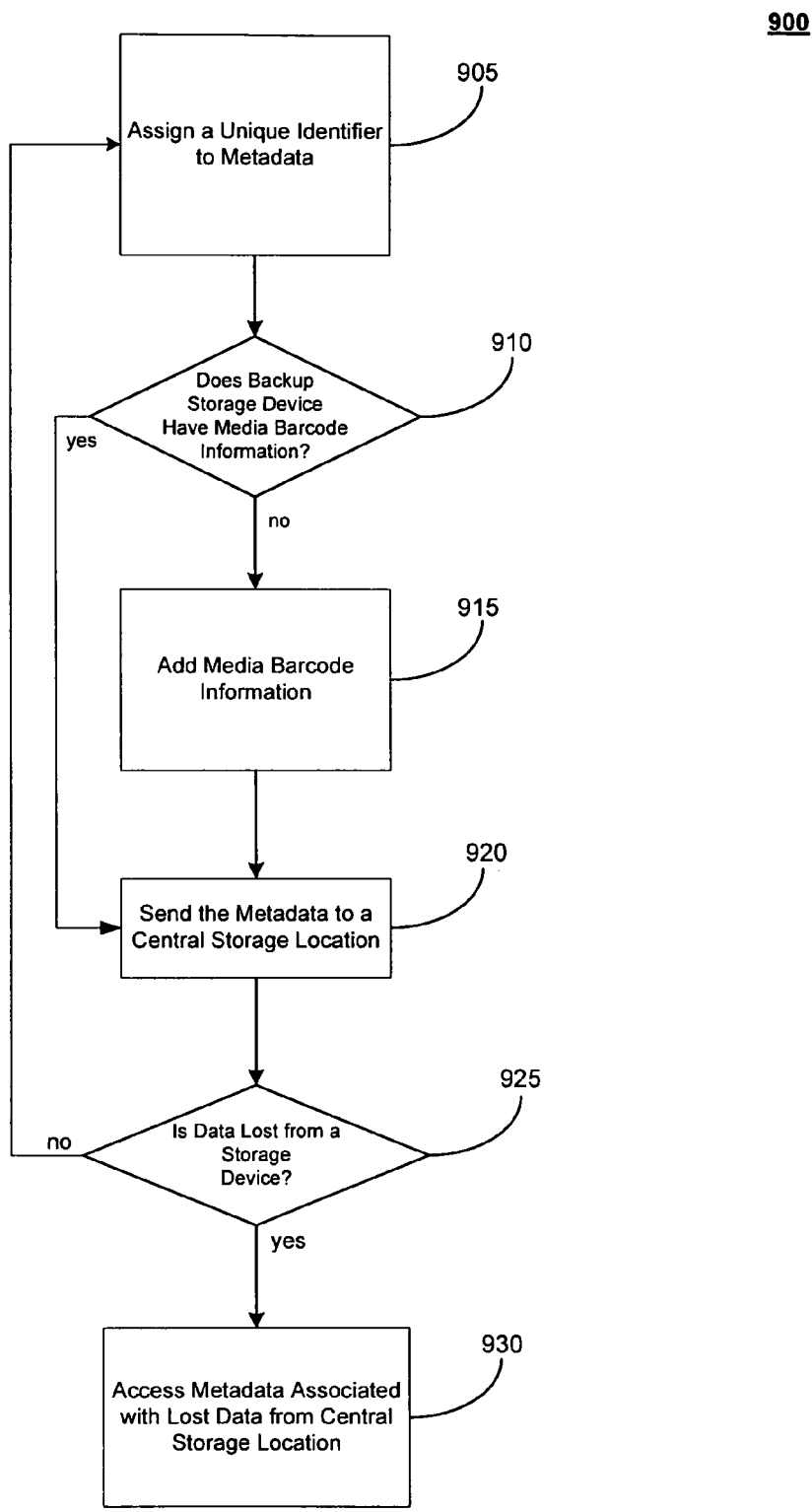
FIG. 9 is a flow diagram illustrating some of the steps involved in using metadata for identifying backed up storage media during data recovery according to an embodiment of the invention.

FIG. 9 is a flow diagram 900 illustrating some of the steps involved in using metadata for identifying backed up storage media during data recovery according to an embodiment of the invention. At step 905 a unique (i.e., worldwide unique) identifier may be assigned to metadata associated with application or other information data that is copied to a storage device. The identifier may be used to identify the particular storage device where the data is stored or backed up. Barcodes, or other optical patterns may be used to identify and catalog storage devices. Optical recognition systems can reliably read a barcode looking for a pattern match to identify the storage media sought. If it is determined that the storage device includes storage media that is barcoded for identification and selection by, for example, a robotic arm (step 910), information corresponding to the media barcode is also added to the metadata.

If no barcode data is found in the identifier, the barcode identifier information for the storage media may be written and stored to the metadata (step 915). At step 920, once the identifier information is added to the metadata, it may be sent to a central storage location comprising one or storage devices. If data is lost from a particular storage device (step 925), e.g., a primary storage volume, metadata associated with the lost data may be accessed from the central storage device (step 930). Once accessed, information such as the media barcode information and/or unique identifier may be used to determine the storage location of the stored copy of the lost data (step 930). The stored copy of the lost data may be then retrieved and sent to the storage device from which the data was lost. Alternatively, if this storage device has malfunctioned, the retrieved or recovered data may be sent to another storage device, database, or information storing device.

Using the metadata associated with the unique identifier, lost data information may be accessed from the correct backup storage device that holds a stored copy of the desired data of interest. Also, using the metadata associated with the media barcode information, lost data information may be accessed from the correct barcode storage media within a particular backup storage device in an expedited manner.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A system for maintaining metadata in an electronic storage network comprising:
   a plurality of networks electronically linked to each other, the plurality of networks having a storage operation capability and which include client applications; and primary data stored on at least a first storage device;
   at least a first and second media agents comprising computer hardware having one or more computer processors, each of the first and second media agents configured to create at least secondary copies of first and second portions of the primary data on at least a second storage device,
   wherein a first media agent creates a first set of metadata that is stored in a first metadata storage device, wherein the second media agent creates a second set of metadata that is stored in a second metadata storage device;
   a centralized metadata storage device, the first and second media agents configured to copy the first and second sets of metadata to the centralized metadata storage device to create at least a copy of the first set of meta data and a copy of the second set of metadata on the centralized metadata storage device, wherein the centralized metadata storage device is different than the first and second metadata storage devices; and
   at least a storage management component comprising computer hardware having one or more computer processors, the storage management component configured to identify the first media agent in association with the copy of the first set of metadata and the second media agent in association with the copy of the second set of metadata stored in the centralized metadata storage device, the at least one storage management component is further configured to:
   determine whether the second data storage device that stores the secondary copies of the first and second portions of the primary data has a unique storage device identifier;
   store the unique identifier of the second data storage device in association with the first and second sets of metadata stored on the centralized metadata storage device;
   detect a loss of at least a portion of the first set of metadata on the first metadata storage device;
   use information about the first media agent to locate the copy of the first set of metadata stored on the centralized metadata storage device;
   reconstruct the loss of the portion of the first set of metadata on the first metadata storage device using the copy of the first set of metadata stored on the centralized metadata storage device based on the association of the copy of the first set of metadata with the first media agent; and
   use the unique storage device identifier to locate the second storage device having the secondary copy of the first portion of the primary data.

2. The system of claim 1 wherein the storage management component identifies, collects, and stores metadata relating to system operation.

3. The system of claim 1 wherein the storage management component detects an interruption of metadata transfer from a first system component to a second system component.

4. The system of claim 3 wherein the storage management component compares the metadata in the first system component with metadata in the second system component to determine differences, if any.

5. The system of claim 4 wherein the storage management component determines whether metadata from the first system component can be transferred to the second system such that the first and second system components have substantially the same metadata if differences are determined.

6. The system of claim 5 wherein the storage management component coordinates transfer metadata from the first system component to the second system component if the first system component has metadata necessary to make the metadata in the second system component substantially the same as the metadata in the first system component.

7. The system of claim 5 wherein the storage management component searches the storage network for the metadata missing from the second system component if the storage management component determines that the missing metadata is not available from the first system component.

8. The system of claim 5 wherein the storage management component searches other components within a storage operation cell.

9. The system of claim 5 wherein the storage management component searches other storage operation cells.

10. The system of claim 5 wherein the storage management component searches other storage management components in other storage operation cells.

11. The system of claim 7 wherein the storage management component identifies portions of the missing metadata in different locations.

12. The system of claim 11 wherein the storage management component obtains copies the identified missing portions from the different locations to the storage device.

13. The system of claim 12 wherein the storage management component reconstructs the missing metadata from the identified missing portions.

14. The system of claim 13 wherein the storage management component reconstructs the missing metadata by integrating the identified missing portions into a metadata arrangement similar to or the same as an original arrangement of the missing metadata.

15. The system of claim 14 wherein the identified missing portions into a metadata are arranged based temporal criteria.

16. The system of claim 12 wherein the storage management component analyzes identified missing portions to determine whether the missing metadata may be reconstructed.

17. The system of claim 16 wherein the storage management component performs additional network searches if the identified missing portions of metadata are insufficient to reconstruct the missing metadata.

18. The system of claim 14 wherein the storage management component reconstructs the missing metadata on the storage devices and copies the reconstructed missing metadata from the storage device to the second system component.

19. The system of claim 7 wherein the missing metadata is not available from the first system component because the missing metadata is corrupted, has been deleted or is unavailable due to hardware or software failure.

20. A method for maintaining and restoring metadata in an electronic storage network which includes a client computer networked to at least another client computer or a server, comprising:
  managing a storage operation network including client applications, running on the client computer, with a storage management component, resident on at least one of the client computer, the other client computer, or the server;
  copying with at least first and second media agents comprising computer hardware, first and second portions of primary data stored on at least a first storage device to at least a second storage device to create at least secondary copies of the first and second portions of the primary data on the second storage device, wherein a first media agent creates a first set of metadata that is stored in a first metadata storage device, and wherein the second media agent creates a second set of metadata that is stored in a second metadata storage device;
  copying the first and second sets of metadata to a centralized metadata storage device to create a copy of the first set of metadata and a copy of the second set of metadata on the centralized metadata storage device, wherein the centralized metadata storage device is different than the first and second metadata storage devices; and
  associating the first media agent with the copy of the first set of metadata stored in the centralized storage device, and associating the second media agent with the copy of the second set of metadata stored in the centralized metadata storage device;
  determining whether the second data storage device that stores the secondary copies of the first and second portions of the primary data includes a unique storage device identifier;
  storing the unique storage device identifier of the second data storage device in association with the first and second sets of metadata stored on the centralized metadata storage device;
  detect a loss of at least a portion of the first set of metadata on the first metadata storage device;
  use information about the first media agent to locate the copy of the first set of metadata stored on the centralized metadata storage device;
  reconstructing the loss of the portion of the first set of metadata on the first metadata storage device using the copy of the first set of metadata stored on the centralized metadata storage device based on the association of the copy of the first set of metadata with the first media agent; and
  using the unique storage identifier to locate the second storage device having the secondary copy of the first portion of the primary data.

21. The method of claim 20 further comprising identifying, collecting, and storing metadata relating to system operation.

22. The method of claim 20 further comprising detecting an interruption of metadata transfer from a first system component to a second system component.

23. The method of claim 22 further comprising compares the metadata in the first system component with metadata in the second system component to determine differences, if any.

24. The method of claim 23 further comprising determining whether metadata from the first system component can be transferred to the second system such that the first and second system components have substantially the same metadata if differences are determined.

25. The method of claim 24 further comprising coordinating transfer of metadata from the first system component to the second system component if the first system component has metadata necessary to make the metadata in the second system component substantially the same as the metadata in the first system component.

26. The method of claim 24 further comprising searching the storage network for the metadata missing from the second system component if the storage management component determines that the missing metadata is not available from the first system component.

27. The method of claim 26 wherein the searching further comprises searching other components within a storage operation cell.

28. The method of claim 26 wherein the searching further comprises searching other storage operation cells.

29. The method of claim 26 wherein the searching further comprises searching other storage management components in other storage operation cells.

30. The method of claim 26 further comprising identifying portions of the missing metadata in different locations.

31. The method of claim 30 further comprising obtaining copies of the identified missing portions from the different locations to the storage device.

32. The method of claim 31 further comprising reconstructing the missing metadata from the identified missing portions.

33. The method of claim 32 wherein the reconstructing further comprises integrating the identified missing portions into a metadata arrangement similar to or the same as an original arrangement of the missing metadata.

34. The method of claim 33 further comprising arranging the identified missing portions into a metadata on a temporal basis.

35. The method of claim 31 further comprising analyzing identified missing portions to determine whether the missing metadata may be reconstructed.

36. The method of claim 35 further comprising performing additional network searches if the identified missing portions of metadata are insufficient to reconstruct the missing metadata.

37. The method of claim 33 further comprising: reconstructing the missing metadata on the storage devices; and copying the reconstructed missing metadata from the storage device to the second system component.

38. The method of claim 26 wherein the missing metadata is not available from the first network component because the missing metadata is corrupted, has been deleted or is unavailable due to hardware or software failure.

* * * * *